US008902294B2

(12) United States Patent
Endo

(10) Patent No.: US 8,902,294 B2
(45) Date of Patent: Dec. 2, 2014

(54) IMAGE CAPTURING DEVICE AND IMAGE CAPTURING METHOD

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 204 days.

(21) Appl. No.: 13/713,491

(22) Filed: Dec. 13, 2012

(65) Prior Publication Data

US 2013/0100251 A1 Apr. 25, 2013

Related U.S. Application Data

(63) Continuation of application No. PCT/JP2011/064621, filed on Jun. 27, 2011.

(30) Foreign Application Priority Data

Jun. 30, 2010 (JP) .................................. 2010-150317

(51) Int. Cl.
*H04N 13/02* (2006.01)
*H04N 9/083* (2006.01)
(Continued)

(52) U.S. Cl.
CPC .............. *H04N 13/0282* (2013.01); *G03B 7/08* (2013.01); *G03B 11/00* (2013.01); *G03B 35/08* (2013.01); *H04N 5/23212* (2013.01); *H04N 5/2355* (2013.01); *H04N 5/238* (2013.01); *H04N 13/0217* (2013.01)
USPC ............................. 348/46; 348/273; 348/296

(58) Field of Classification Search
CPC .......... G03B 7/08; G03B 11/00; G03B 35/08; H04N 13/0282; H04N 5/2355; H04N 5/238; H04N 13/0217; H04N 5/23212

USPC ............................................................ 348/46
See application file for complete search history.

(56) References Cited

U.S. PATENT DOCUMENTS 6,233,003 B1 5/2001 Ono
7,019,780 B1 3/2006 Takeuchi et al.
(Continued)

FOREIGN PATENT DOCUMENTS

| JP | 8-69063 A | 3/1996 |
|---|---|---|
| JP | 10-42314 A | 2/1998 |

(Continued)

OTHER PUBLICATIONS

International Search Report for PCT/JP2011/064621 mailed on Jul. 26, 2011.

(Continued)

*Primary Examiner* — Hee-Yong Kim
(74) *Attorney, Agent, or Firm* — Birch, Stewart, Kolasch & Birch, LLP

(57) ABSTRACT

Present invention provides an imaging element that includes a first pixel group and a second pixel group, a pickup execution control unit that performs pixel addition by exposing the first pixel group and the second pixel group of the imaging element during the same exposure in a case of pickup in an SN mode and performs pixel addition by exposing the first pixel group and the second pixel group of the imaging element during different exposure times in a case of pickup in a DR mode, a diaphragm that is arranged in a light path through which the light fluxes which are incident to the imaging element pass, and a diaphragm control unit that, in the case of pickup in the DR mode, sets the diaphragm value of the diaphragm to be a value which is greater than that of the case of pickup in the SN mode.

18 Claims, 20 Drawing Sheets

(51) Int. Cl.
*H04N 3/14* (2006.01)
*H04N 5/335* (2011.01)
*H04N 9/04* (2006.01)
*G03B 7/08* (2014.01)
*G03B 11/00* (2006.01)
*G03B 35/08* (2006.01)
*H04N 5/232* (2006.01)
*H04N 5/235* (2006.01)
*H04N 5/238* (2006.01)

(56) References Cited

U.S. PATENT DOCUMENTS

2010/0245546 A1    9/2010  Kuroki
2011/0096216 A1*   4/2011  Kawai et al. .................. 348/296
2011/0216228 A1*   9/2011  Kawamura et al. ........... 348/273
2012/0057000 A1    3/2012  Rohaly et al.

FOREIGN PATENT DOCUMENTS

| | | |
|---|---|---|
| JP | 2001-61165 A | 3/2001 |
| JP | 2001-222083 A | 8/2001 |
| JP | 2002-369223 A | 12/2002 |
| JP | 2008-187385 A | 8/2008 |
| JP | 2008-299184 A | 12/2008 |
| JP | 2009-168995 A | 7/2009 |
| JP | 2009-527007 A | 7/2009 |
| JP | 2010-81580 A | 4/2010 |

OTHER PUBLICATIONS

Written Opinion of the International Searching Authority for PCT/JP2011/064621 mailed on Jul. 26, 2011.

* cited by examiner

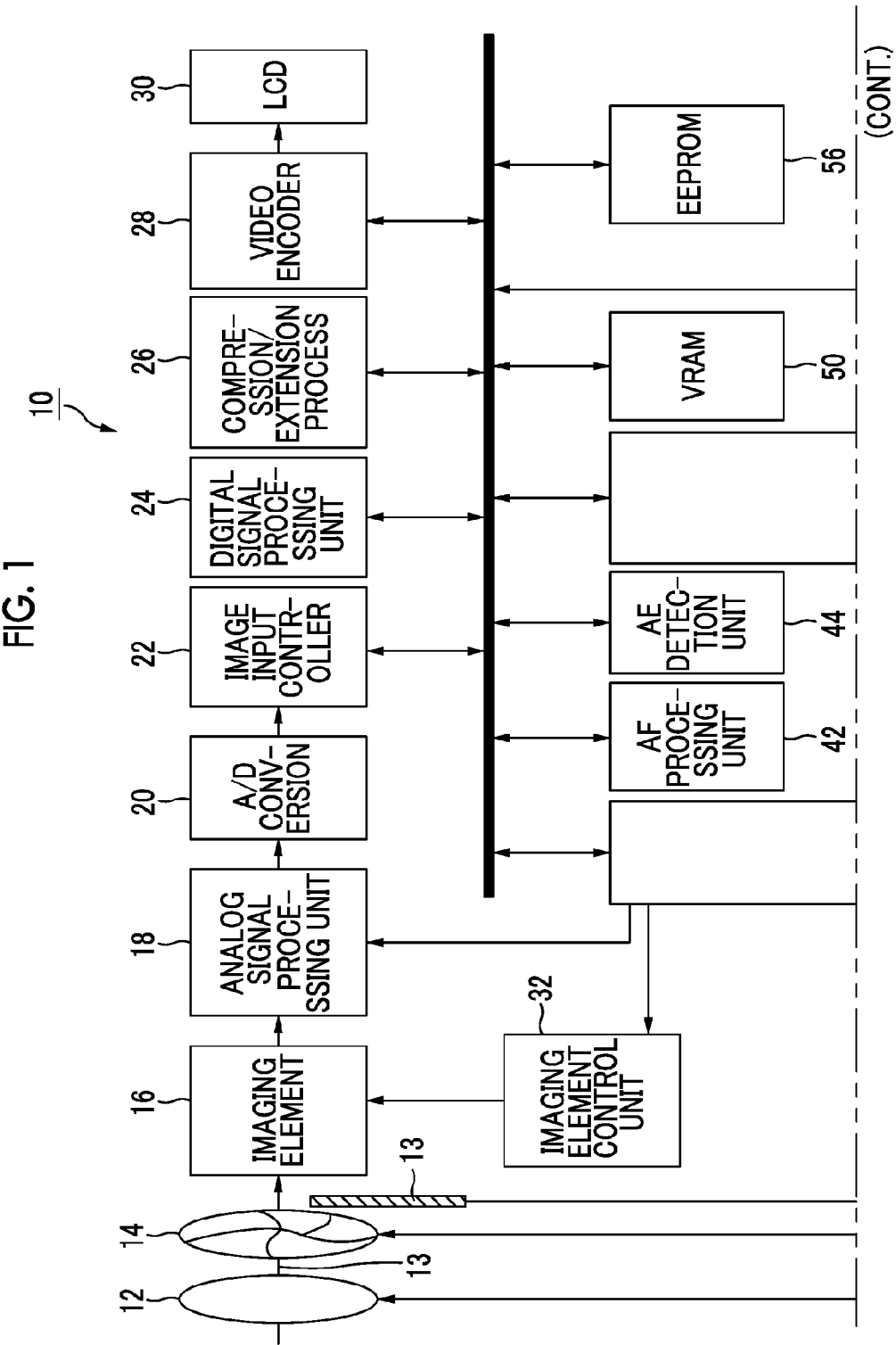

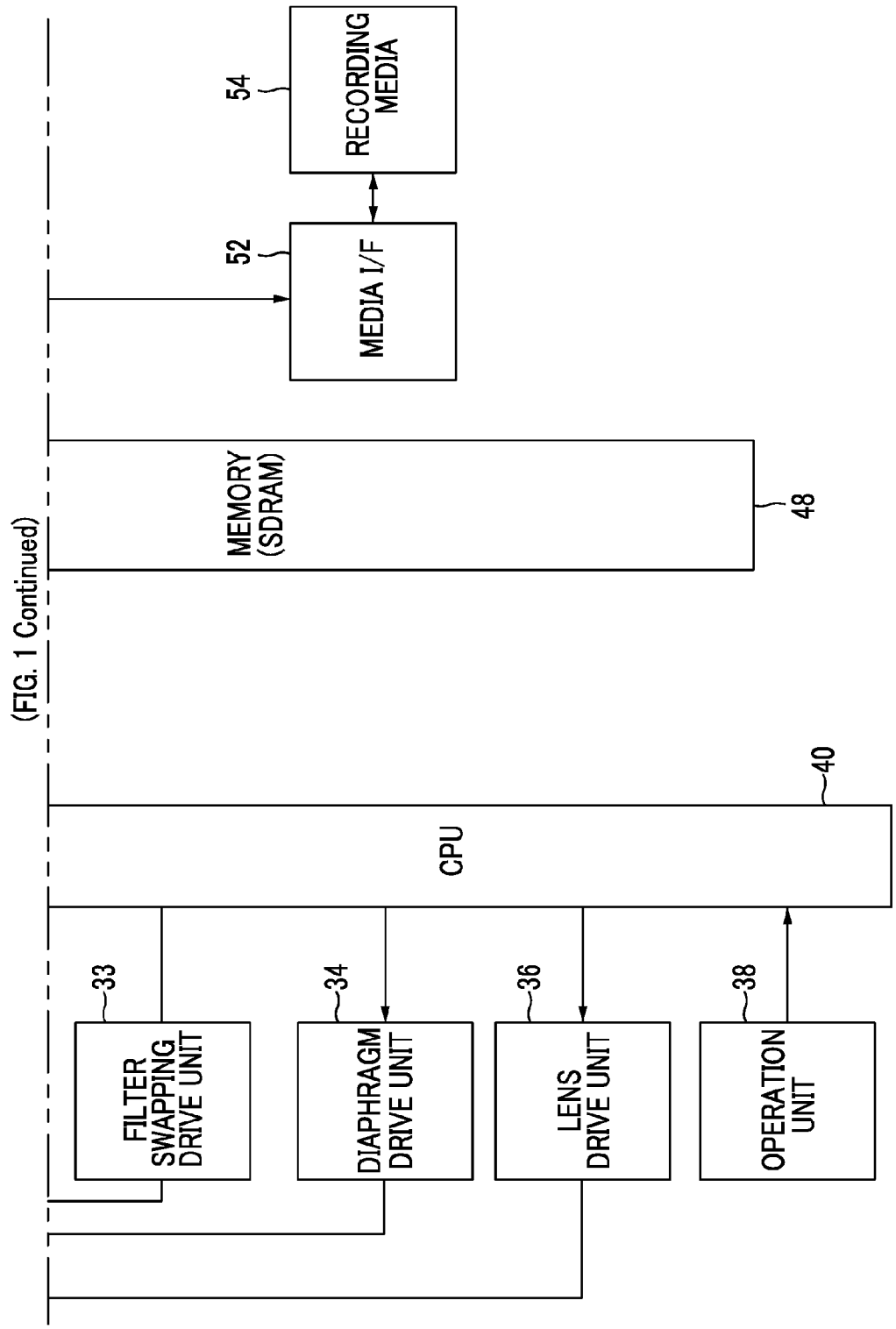

(MAIN PIXEL)

(SUB PIXEL)

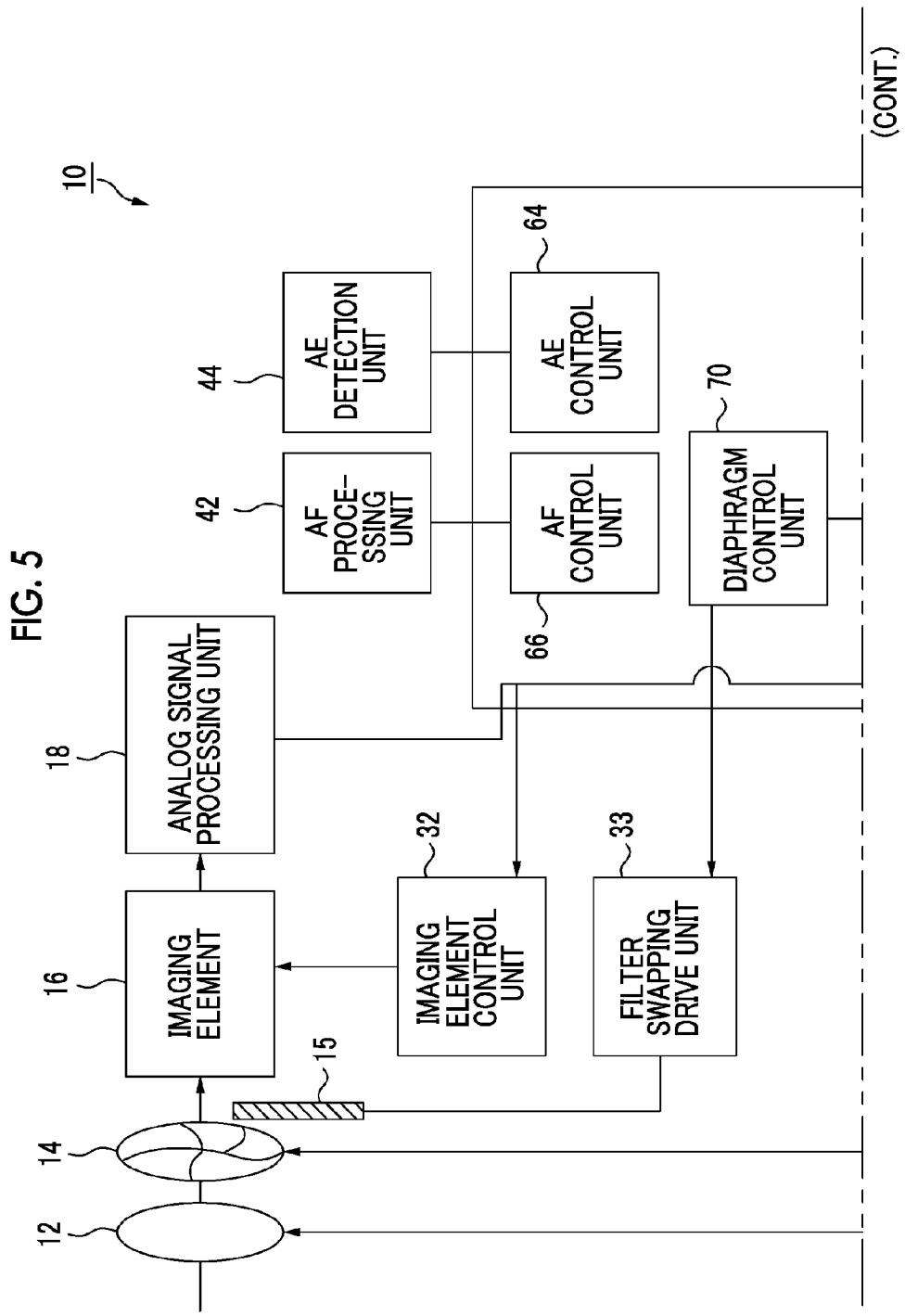

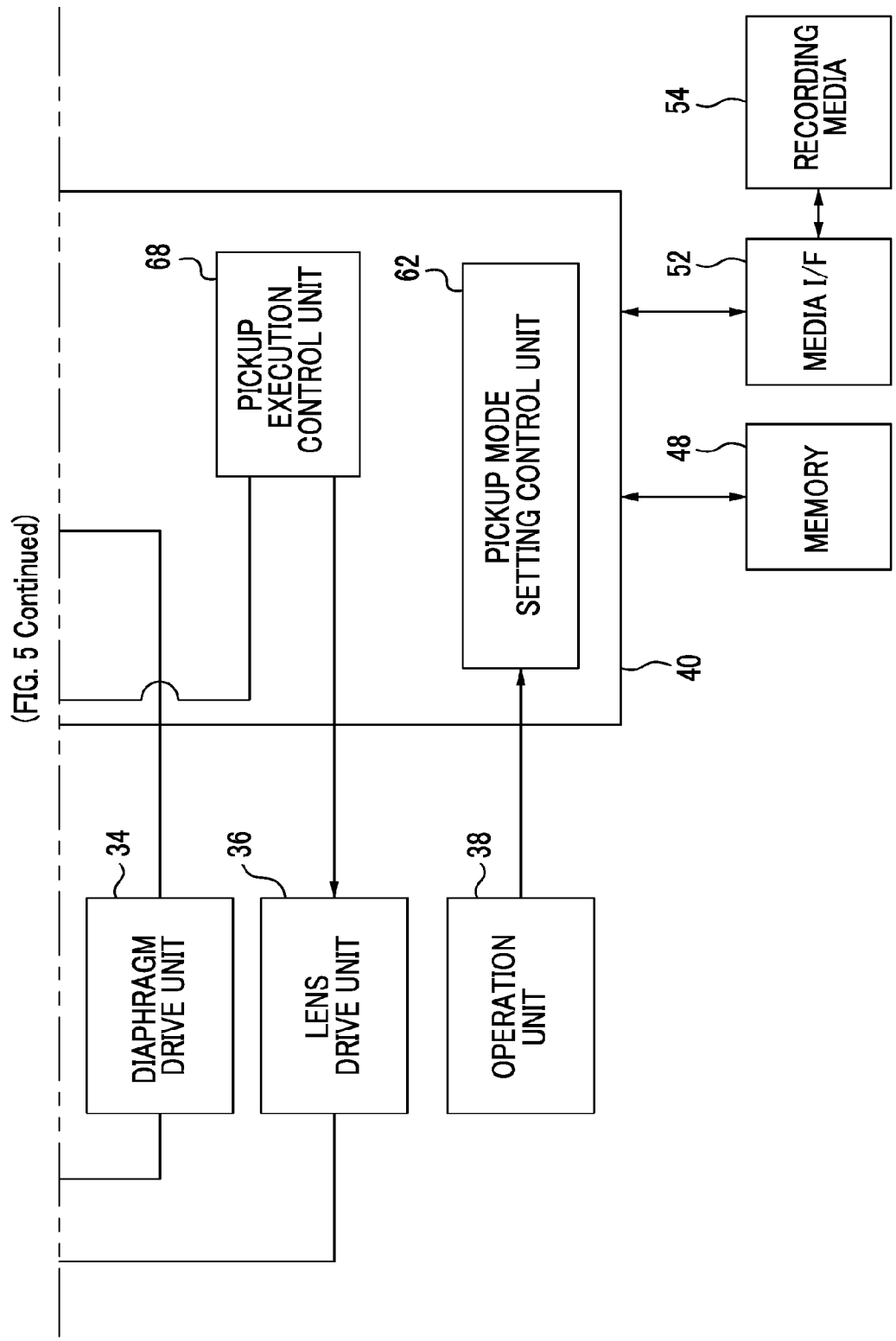

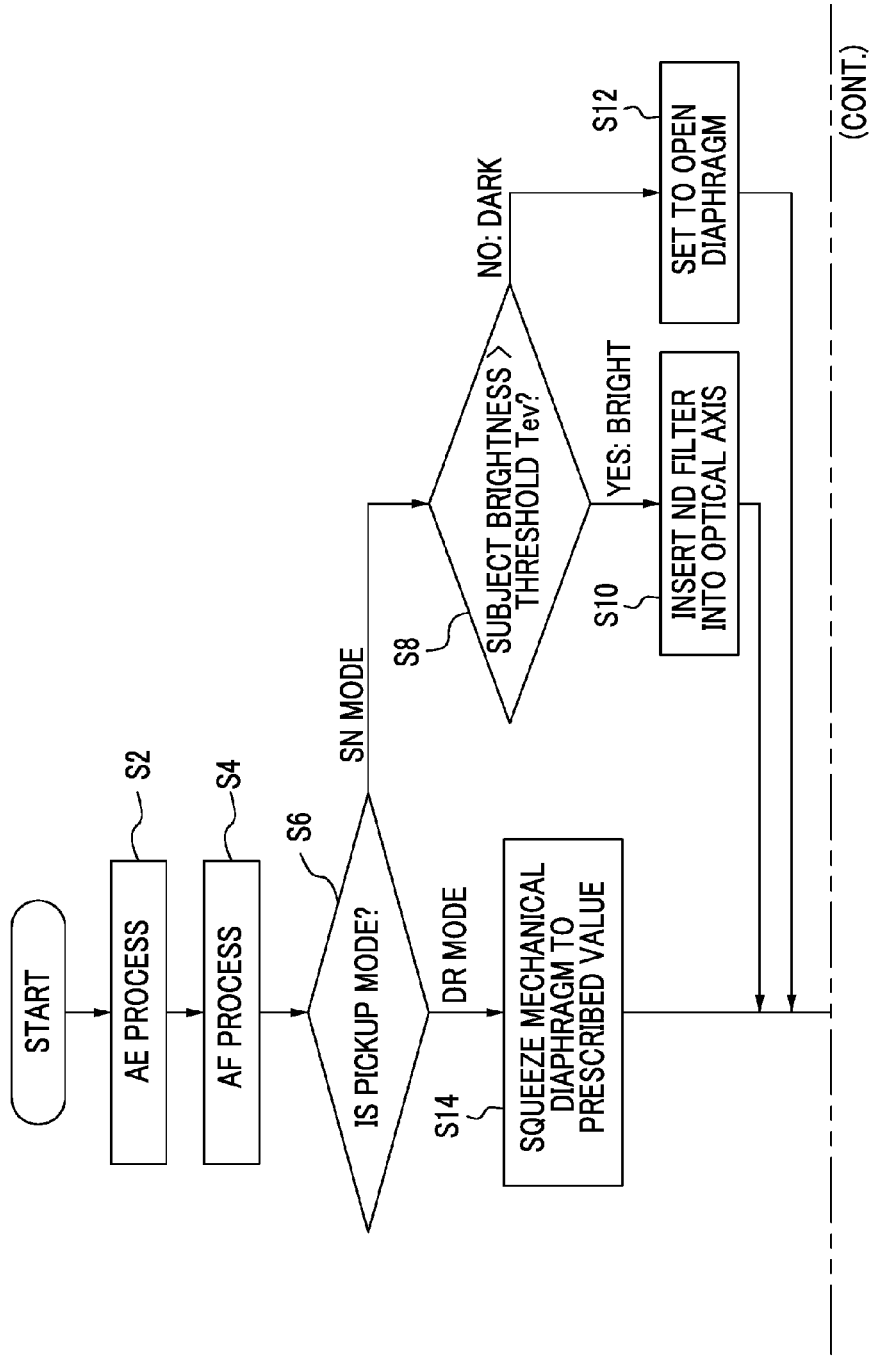

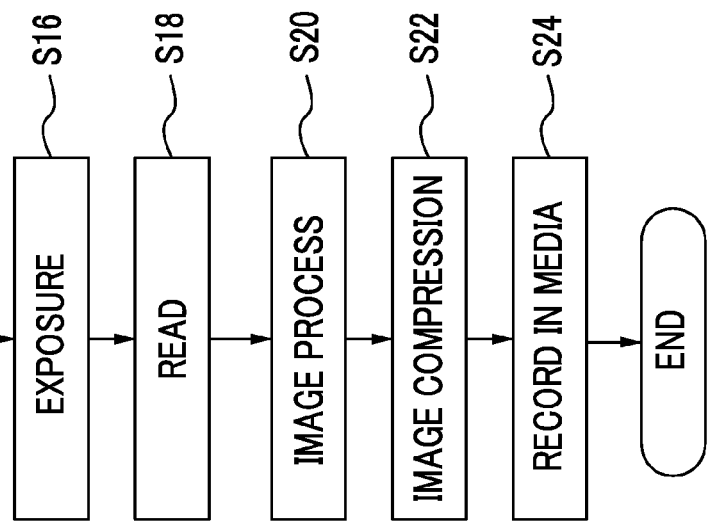

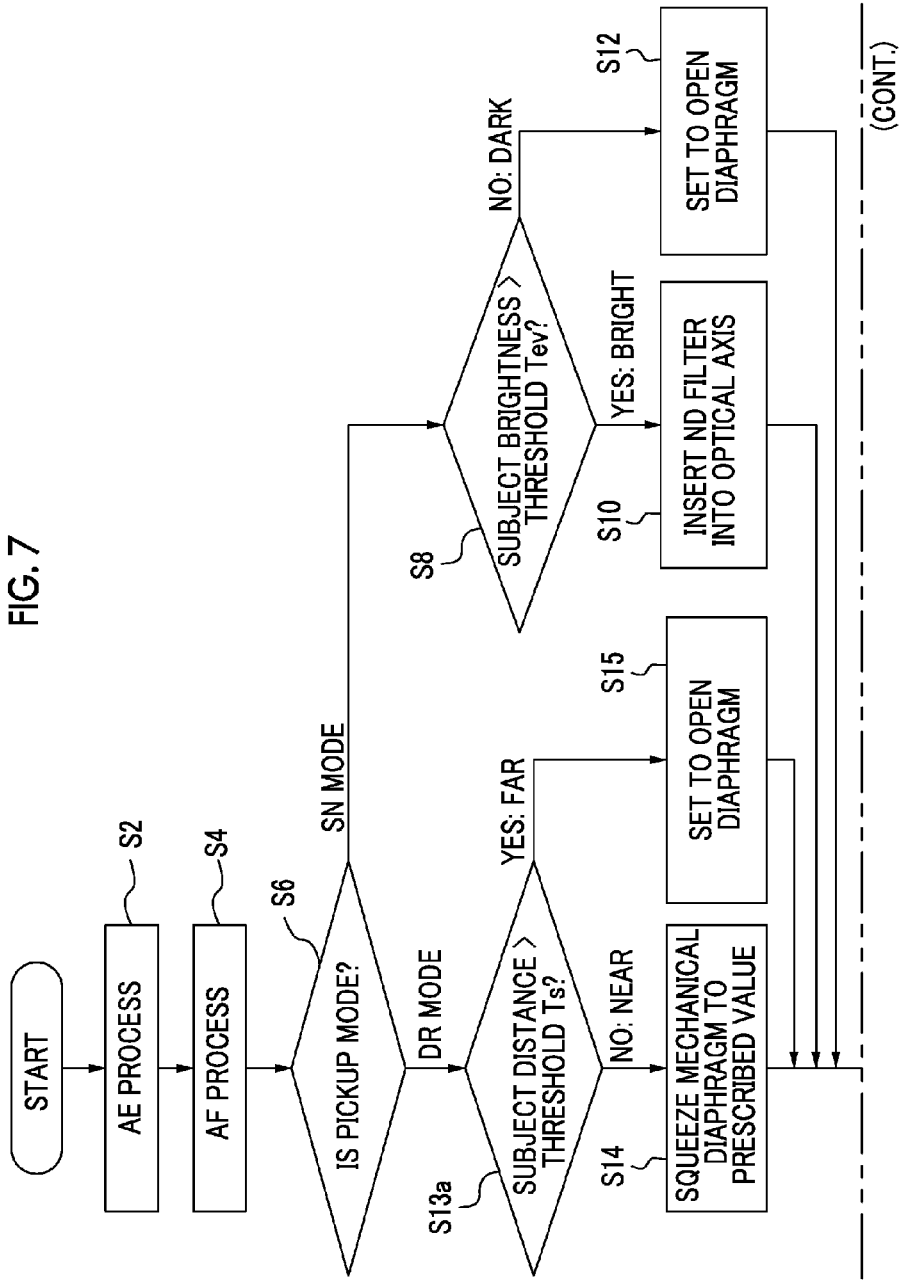

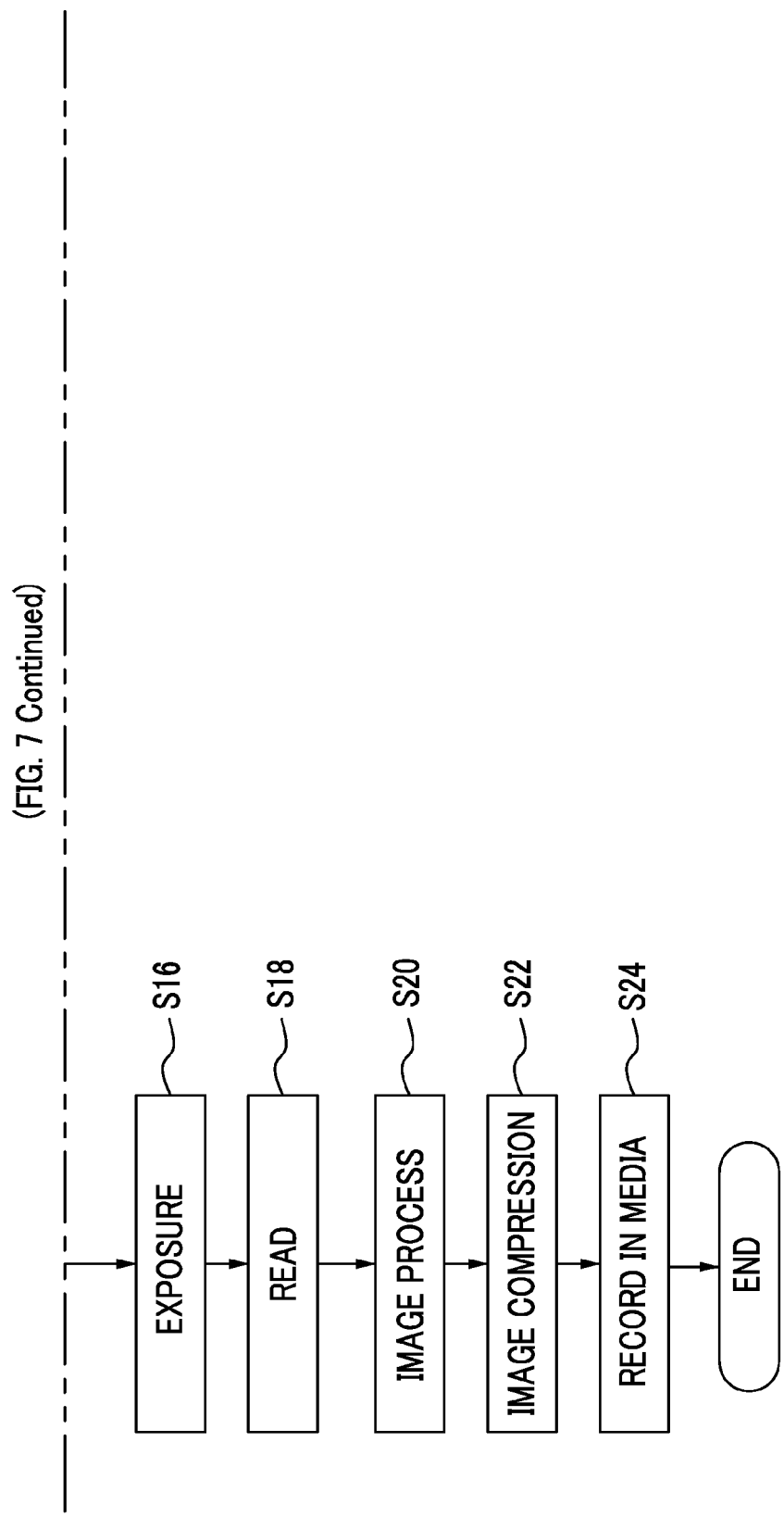

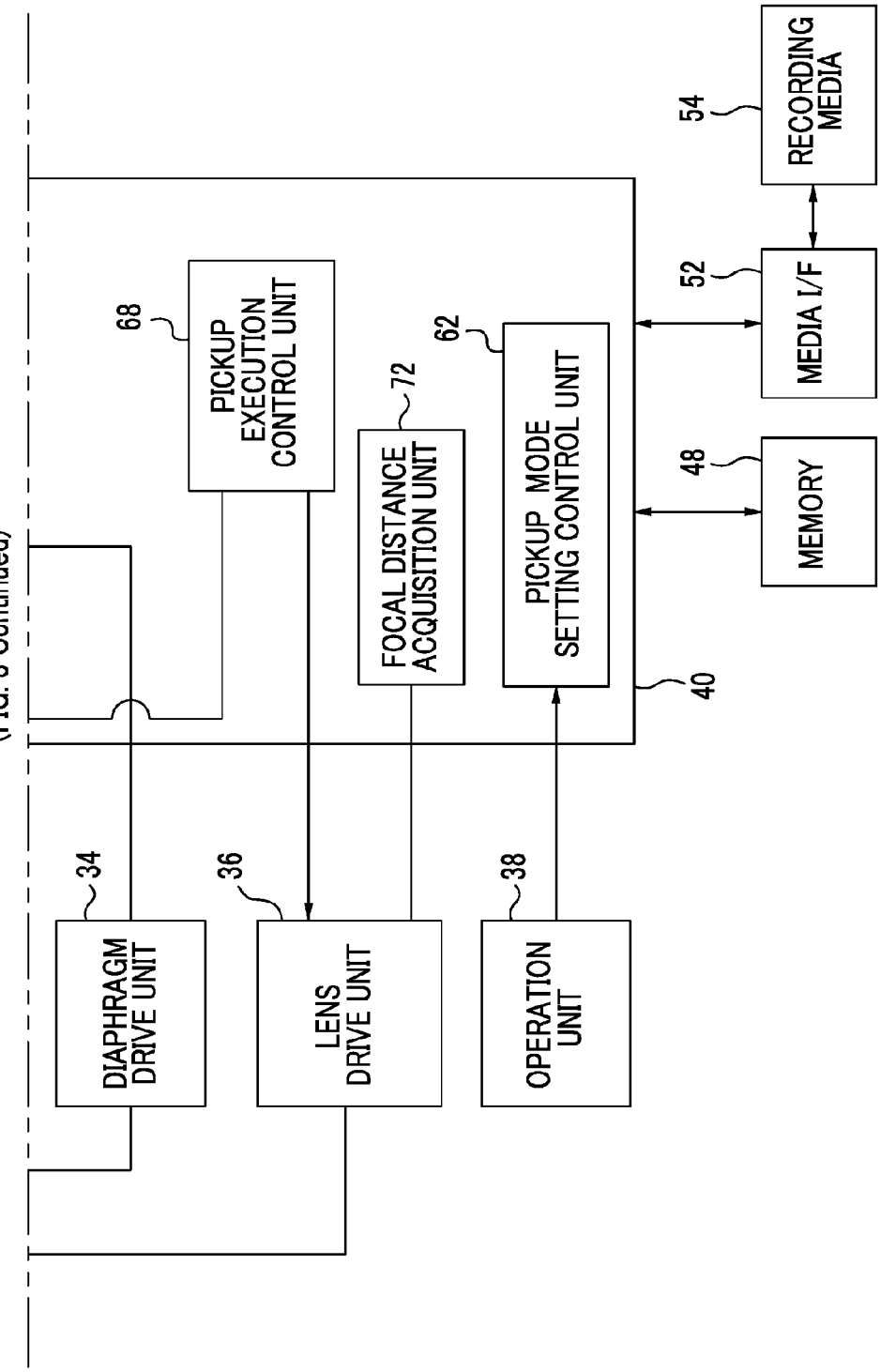

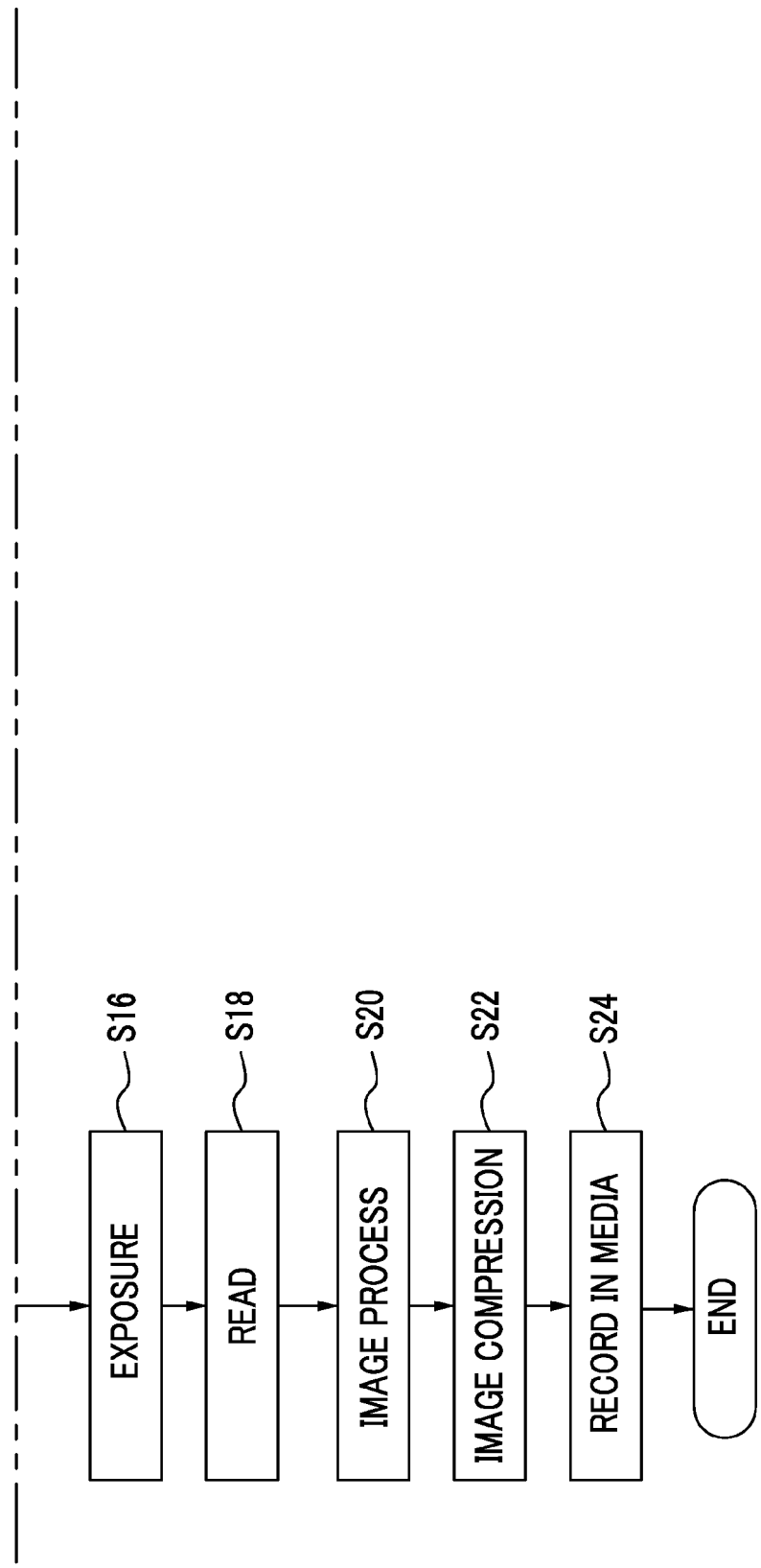

FIG. 11A

| R | R | G | G |
|---|---|---|---|
| G | G | B | B |

FIG. 11B

| R | G |
|---|---|
| R | G |
| G | B |
| G | B |

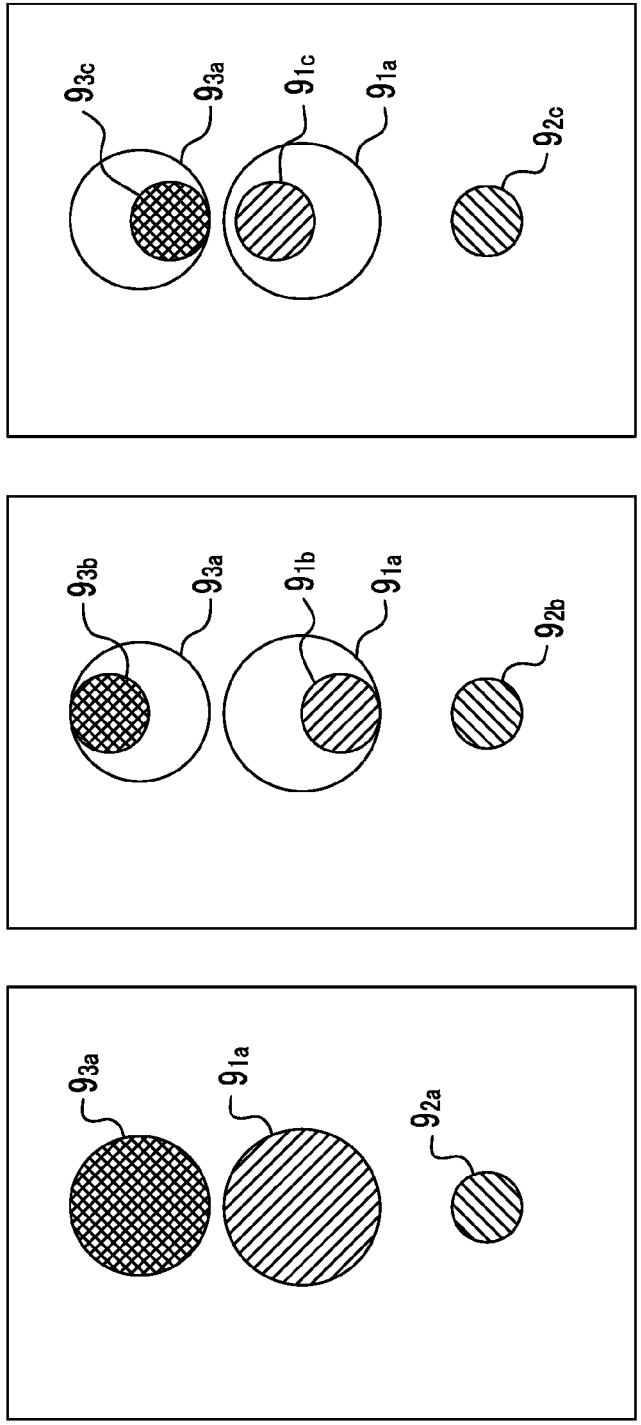

IMAGE CAPTURING DEVICE AND IMAGE CAPTURING METHOD

Cross Reference to Related Applications:

This non-provisional application is a Continuation of International Application No. PCT/JP2011/064621 filed on Jun. 27, 2011, which claims priority under 35 U.S.C. 119(a) to Japanese Patent Application No. 2010-150317 filed in Japan, on Jun. 30, 2010. The entire contents of all of the above applications are hereby incorporated by reference.

BACKGROUND OF THE INVENTION

1. Field of the Invention

The present invention relates to an image capturing device and an image capturing method which can generate a stereoscopic image including planar images viewed from multiple viewpoints using a single optical pickup system.

2. Description of the Related Art

In the related art, an image capturing device is known which can generate a stereoscopic image including planar images viewed from multiple viewpoints using a single optical pickup system.

JP2009-527007T discloses a configuration in which a single optical pickup system is provided and pupil division is performed by rotating a diaphragm, thereby generating a stereoscopic image.

JP2009-168995A discloses a configuration in which polarizing elements are provided and light is received using an imaging element for each light path, thereby acquiring phase information using a single optical pickup system.

JP1998-42314A (JP-H10-42314A) discloses an image capturing device which includes a single optical pickup system and an imaging element in which a first pixel group and a second pixel group are arranged to perform photoelectric conversion on light fluxes passing through different regions of the single optical pickup system, and which generates a stereoscopic image including a planar image acquired using the first pixel group and a planar image acquired using the second pixel group.

JP2008-299184A discloses a configuration in which the output of a first pixel is added to the output of a second pixel in the image capturing device disclosed in JP1998-42314A (W-H10-42314A).

JP2008-187385A discloses a configuration in which exposure control is performed in cycles set for 2D moving image pickup and 3D moving image pickup in a compound eye image capturing device including a plurality of optical pickup systems. Since depth is not changed in the 3D moving image pickup, a machine diaphragm is not moved as much as possible.

SUMMARY OF THE INVENTION

In the image capturing device (hereinafter, referred to as "monocular 3D image capturing device") which is capable of generating a stereoscopic image including planar images viewed from multiple viewpoints using a single optical pickup system, gradation collapse is generated in a non-focused section when a wide dynamic range planar image is generated based on the planar images viewed from the multiple viewpoints. The structure of the gradation collapse will be described below.

First, a case in which three subjects 91, 92, and 93 are imaged using a monocular image capturing device which does not perform pupil division will be described with reference to FIG. 12A. From among three images 91a, 92a, and 93a, the images of which are formed on the imaging element 16, only the image 92a of the subject 92 on a focusing plane D comes into focus on the imaging element 16. A distance of the subject 91 from the pickup lens 12 is greater than a distance from the focusing plane D, the focusing image 91d thereof is formed at a position which is closer to the pickup lens 12 than the imaging element 16, and thus the image 91a of the subject 91 is out of focus and becomes a dimmed image, that is, a blurred image. In addition, a distance of the subject 93 from the pickup lens 12 is less than a distance from the focusing plane D, a focusing image 93d is formed at a position which is further from the pickup lens 12 than the imaging element 16, and the image 93a of the subject 93 is also out of focus and becomes a blurred image.

Subsequently, a case in which the three subjects 91, 92, and 93 are imaged using the monocular 3D image capturing device which performs pupil division will be described. The monocular 3D image capturing device of this example has a state in which the pupil of the pickup lens 12 is restricted to only an upper side using a shutter 95 as shown in FIG. 12B, and a state in which the pupil of the pickup lens 12 is restricted to only a lower side using the shutter 95 as shown in FIG. 12C. The blur amount (the amount by which an image is out of focus) and the position of an image on the imaging element 16 of this kind of monocular 3D image capturing device are different from those of the monocular image capturing device shown in FIG. 12A. That is, in a state shown in FIG. 12B, the blur amount of the image 91b of the subject 91 is less compared to the image 91a of the subject 91 on which pupil division is not performed (FIG. 13A) as shown in FIG. 13B, and the position thereof moves to the lower side of the drawing. In addition, the blur amount of the image 93b of the subject 93 is less and the position thereof moves to the upper side of the drawing. In a state shown in FIG. 13C, the blur amount of the image 91c of the subject 91 is less compared to the image 91a of the subject 91 on which pupil division is not performed (FIG. 13A) as shown in FIG. 13C, and the position thereof moves to the upper side of the drawing. In addition, the blur amount of the image 93c of the subject 93 is less and the position thereof moves to the lower side of the drawing.

The focal positions of the image 91b and the image 91c and the focal positions of the image 93b and the image 93c are shifted in the image shown in FIG. 13B and the image shown in FIG. 13C of the monocular 3D image capturing device. That is, when a high-resolution planar image is radiated, light fluxes from the same subject pass through the different pupil positions of the pickup lens 12, and thus the images of the same subject are formed at different positions of the imaging element 16. Therefore, there is a problem in that gradation collapse due to parallax is generated if pixel addition is performed on two planar images which are acquired through exposure performed during different exposure times.

JP2009-527007T to JP2008-187385A do not disclose a configuration which can solve the gradation collapse due to parallax.

Meanwhile, in the configuration disclosed in JP2008-299184A, a wide dynamic range image cannot be generated. In addition, since pixel addition is simply performed on adjacent pixels. Therefore, there is a problem in that the resolution of a focused main subject is deteriorated due to the pixel addition. For example, when two pixels are mixed, resolution is deteriorated to ½.

Since a compound eye method is used in the configuration disclosed in JP2008-187385A, image formation shift is not generated even though a small diaphragm is used. In addition, the chief aim is placed on the non-change of a diaphragm.

The present invention has been made in consideration of the above problems in the related prior art and an object thereof is to provide an image capturing device and an image capturing method which can reduce image formation shift due to pupil division and which can improve the quality of a wide dynamic range image.

In order to accomplish the above object, the present invention provides an image capturing device which includes a single optical pickup system and an imaging element that has a first pixel group and a second pixel group which respectively perform photoelectric conversion on light fluxes passing through different regions of the single optical pickup system, and which can generate a stereoscopic image including pixel data of the first pixel group and pixel data of the second pixel group by imaging a same scene using the first pixel group and the second pixel group, the image capturing device including: pickup mode setting unit that receives input setting of either a first plane pickup mode or a second plane pickup mode in which a planar image is acquired by performing pixel addition on the pixel data of the first pixel group and the pixel data of the second pixel group; pickup execution control unit that acquires a planar image by performing pixel addition on the pixel data of the first pixel group and the pixel data of the second pixel group in such a way as to expose the first pixel group and the second pixel group of the imaging element during a same exposure time in a case of pickup in the first plane pickup mode, and acquires a wide dynamic range planar image by performing pixel addition on the pixel data of the first pixel group and the pixel data of the second pixel group in such a way as to expose the first pixel group and the second pixel group of the imaging element during different exposure times in a case of pickup in the second plane pickup mode; a diaphragm device that is arranged in a light path through which the light fluxes which are incident to the imaging element pass; and diaphragm control unit that, in a case of pickup in the second plane pickup mode, sets a diaphragm value of the diaphragm device to a value which is greater than a diaphragm value in a case of pickup in the first plane pickup mode.

That is, in a case of pickup in the second plane pickup mode (the DR mode), the diaphragm value of the diaphragm device is set to a value which is greater than the diaphragm value in the case of pickup in the first plane pickup mode, and thus image formation shift due to pupil division decreases and the quality of a wide dynamic range planar image can be improved.

Meanwhile, the present invention is not limited to such a case in which the diaphragm device is arranged between the optical pickup system and the imaging element, or a case in which the optical pickup system includes a plurality of lenses (a lens group) and the diaphragm device is arranged in the lens group may be used.

In an embodiment of the present invention, it is preferable that the first pixel group and the second pixel group include light reception elements which are 2-dimensionally arranged, and it is preferable that, in the imaging element, each pixel of the first pixel group and each pixel of the second pixel group be arranged adjacent to each other.

In an embodiment of the present invention, the image capturing device may further include an optical member 4 that performs division on the light fluxes passing through the optical pickup system, and it is preferable that the imaging element include a first imaging element having the first pixel group and a second imaging element having the second pixel group, respectively receiving the light fluxes acquired through pupil division performed using the optical member.

In an embodiment of the present invention, it is preferable that the diaphragm control unit set the diaphragm device to an open state in the case of pickup in the first plane pickup mode.

In addition, in an embodiment of the present invention, the image capturing device may further include a neutral density filter that can be inserted in the light path through which the light fluxes which are incident to the imaging element pass; and subject brightness acquisition unit that acquires subject brightness, and it is preferable that the diaphragm control unit, in the case of pickup in the first plane pickup mode, control whether or not to insert the neutral density filter into the light path based on the subject brightness acquired using the subject brightness acquisition unit.

That is, in the case of pickup in the first plane pickup mode (the SN mode), diffraction due to the diaphragm can be avoided and a higher-quality image can be acquired.

Meanwhile, the present invention is not limited to such a case in which the neutral density filter is arranged between the optical pickup system and the imaging element, or a case in which the optical pickup system includes a plurality of lenses (a lens group) and the neutral density filter is arranged in the lens group may be used.

In an embodiment of the present invention, the image capturing device may further include subject distance acquisition unit that acquires a subject distance, and it is preferable that the diaphragm control unit, in the case of pickup in the second plane pickup mode, switch whether or not to set the diaphragm device to the open state based on the subject distance acquired using the subject distance acquisition unit.

In an embodiment of the present invention, it is preferable that, in the case of pickup in second plane pickup mode and when the subject distance is greater than a threshold, the diaphragm control unit set the diaphragm device to the open state.

That is, in the case of pickup in the second plane pickup mode (the DR mode), image formation shift is small when the subject distance is large, and thus diffraction due to the diaphragm can be avoided by setting the diaphragm device to the open state and a high-quality wide dynamic range image can be acquired.

In an embodiment of the present invention, the image capturing device may further include focal distance acquisition unit that acquires a focal distance of the optical pickup system, and it is preferable that the diaphragm control unit, in the case of pickup in the second plane pickup mode, switch whether or not to set the diaphragm device to the open state based on the focal distance acquired using the focal distance acquisition unit.

In an embodiment of the present invention, it is preferable that the diaphragm control unit, in the case of pickup in the second plane pickup mode and when the focal distance is equal to or less than the threshold, set the diaphragm device to the open state.

That is, in the case of pickup in the second plane pickup mode (the DR mode), image formation shift is small when the focal distance of the optical pickup system is small, and thus diffraction due to the diaphragm can be avoided by setting the diaphragm device to the open state and a higher-quality wide dynamic range image can be acquired.

In an embodiment of the present invention, it is preferable that the diaphragm control unit, in the case of pickup in the second plane pickup mode and when the diaphragm device is set to the open state, switch whether or not to set the neutral density filter to an insertion state based on the subject brightness.

That is, in the case of pickup in the second plane pickup mode (the DR mode), brightness can be adjusted using the neutral density filter and a high-quality image can be acquired even when the diaphragm device is set to the open state.

In addition, the present invention provides an image capturing method for acquiring a planar image including pixel data of a first pixel group and pixel data of a second pixel group by imaging a same scene with the first pixel group and the second pixel group using a single optical pickup system, an imaging element that has the first pixel group and the second pixel group which respectively perform photoelectric conversion on light fluxes passing through different regions of the single optical pickup system, and a diaphragm device that is arranged in a light path through which the light fluxes which are incident to the imaging element pass, the image capturing method including: receiving input setting of either a first plane pickup mode or second plane pickup mode in which a planar image is acquired by performing pixel addition on the pixel data of the first pixel group and the pixel data of the second pixel group; in a case of pickup in the second plane pickup mode, setting a diaphragm value of the diaphragm device to a value which is greater than a diaphragm value in a case of pickup in the first plane pickup mode; and acquiring the planar image by performing pixel addition on the pixel data of the first pixel group and the pixel data of the second pixel group in such a way as to expose the first pixel group and the second pixel group of the imaging element during a same exposure time in a case of pickup in the first plane pickup mode, and acquiring a wide dynamic range planar image by performing pixel addition on the pixel data of the first pixel group and the pixel data of the second pixel group in such a way as to expose the first pixel group and the second pixel group of the imaging element during different exposure times in a case of pickup in the second plane pickup mode.

In an embodiment of the present invention, the image capturing method may further include setting the diaphragm device to an open state in the case of pickup in the first plane pickup mode.

In an embodiment of the present invention, the image capturing method may further include, in the case of pickup in the first plane pickup mode, controlling whether or not to insert the neutral density filter into the light path based on the subject brightness acquired using the subject brightness acquisition unit by using neutral density filter that can be inserted in the light path through which the light fluxes which are incident to the imaging element pass and subject brightness acquisition unit that acquires subject brightness.

In an embodiment of the present invention, the image capturing method may further include, in the case of pickup in the second plane pickup mode, switching whether or not to set the diaphragm device to the open state based on the subject distance acquired using the subject distance acquisition unit by using subject distance acquisition unit that acquires a subject distance.

In an embodiment of the present invention, the image capturing method may further include, in the case of pickup in second plane pickup mode and when the subject distance is greater than a threshold, setting the diaphragm device to the open state.

In an embodiment of the present invention, the image capturing method may further include, in the case of pickup in the second plane pickup mode, switching whether or not to set the diaphragm device to the open state based on the focal distance acquired using the focal distance acquisition unit by using focal distance acquisition unit that acquires a focal distance of the optical pickup system.

In an embodiment of the present invention, the image capturing method may further include, in the case of pickup in the second plane pickup mode and when the focal distance is equal to or less than the threshold, setting the diaphragm device to the open state.

In an embodiment of the present invention, the image capturing method may further include, in the case of pickup in the second plane pickup mode and when the diaphragm device is set to the open state, switching whether or not to set the neutral density filter to an insertion state based on the subject brightness.

According to the present invention, the quality of a wide dynamic range image can be improved by reducing image formation shift due to pupil division and solving the spurious resolution.

BRIEF DESCRIPTION OF THE DRAWINGS

FIG. 1 is a block diagram illustrating an example of the hardware configuration of an image capturing device according to the present invention.

FIG. 5 is a block diagram illustrating the main section of the image capturing device according to the first embodiment.

FIG. 6 is a flowchart illustrating the flow of an imaging process example according to the first embodiment.

FIG. 7 is a flowchart illustrating the flow of an imaging process example according to the second embodiment.

FIGS. 11A and 11B are schematic diagrams illustrating an example of Bayer array.

FIG. 12A is an explanatory view illustrating the main section of the imaging system without using pupil division, FIGS. 12B and 12C are explanatory views each illustrating the main section of a 3D monocular imaging system using a pupil division method.

FIGS. 13A to 13C are explanatory views illustrating the problems of the present invention, that is, FIG. 13A is a schematic view illustrating the shape of an image formed using the imaging system without using pupil division, and FIGS. 13B and FIG. 13C are schematic views illustrating the shapes of images formed using the 3D monocular imaging system using the pupil division method.

DESCRIPTION OF THE PREFERRED EMBODIMENTS

Figure 2A:
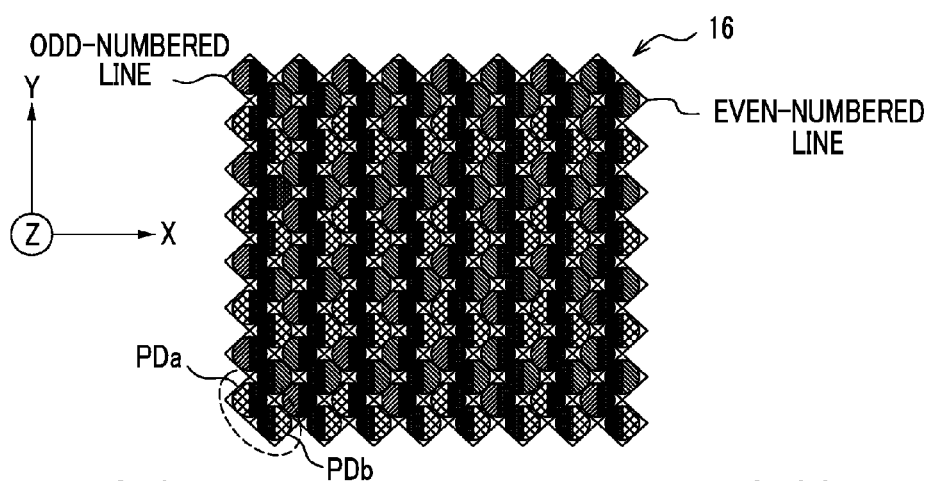
FIGS. 2A to 2C are views illustrating an example of the configuration of an imaging element.

Hereinafter, embodiments of the present invention will be described in detail with reference to the accompanying drawings.

Overall configuration of image capturing device

FIG. 1 is a block diagram illustrating an embodiment of an image capturing device 10 according to the present invention.

The image capturing device 10 records an imaged image in a recording media 54, and the entire operation of the device is integrally controlled by a Central Processing Unit (CPU) 40.

The image capturing device 10 is provided with an operation unit 38 such as a shutter button, a mode dial, a reproduction button, a MENU/OK key, an arrow key, or a BACK key. A signal from the operation unit 38 is input to the CPU 40. The CPU 40 controls each circuit of the image capturing device 10 in response to the input signal. For example, the CPU 40 performs lens drive control, diaphragm drive control, pickup operation control, image process control, image data record/reproduction control, and the display control of a liquid crystal monitor 30 for stereoscopic display.

The shutter button is an operational button that inputs an instruction to start pickup, and includes a two-stage stroke type switch having an S1 switch which is switched on with a half-push, and an S2 switch which is switched on with a full-push. The mode dial is selection unit that selects a pickup mode such as a 2D pickup mode, a 3D pickup mode, a DR pickup mode, or an SN mode.

The reproduction button is a button which is used to switch to a reproduction mode which displays a still image or a moving image of the stereoscopic image (3D image) and the planar image (2D image) which is radiated and recorded on the liquid crystal monitor 30. MENU/OK keys are operation keys which respectively function as a menu button used to perform an instruction to display a menu on the screen of the liquid crystal monitor 30, and an OK button used to indicate confirmation or execution of selected content. Arrow keys are operation units which input indications of the four directions of up, down, right and left, and function as buttons (cursor movement operation unit) which are used to select an item from the menus on the screen or to indicate selection of various types of setting items from respective menu items. In addition, the top and bottom keys of the arrow keys function as zoom switches during pickup or reproduction zoom switches during the reproduction mode, the left and right keys function as frame advance (forward direction/reverse direction advance) buttons during the reproduction mode. A BACK key is used to erase a desired target, such as the selected item, to cancel instructed content, or to return to an operation state immediately before the state.

During the pickup mode, an image light which is used to show a subject is formed on the light reception plane of an imaging element 16 through a pickup lens 12 (optical pickup system), including a focal lens and a zoom lens, and through a diaphragm 14. The pickup lens 12 is driven using a lens drive unit 36 which is controlled by the CPU 40, and performs focus control and zoom control.

The diaphragm 14 is arranged in a light path 13 through which light fluxes incident to the imaging element 16 pass, and includes, for example, five diaphragm blades. The diaphragm 14 is driven using a diaphragm drive unit 34 which is controlled by the CPU 40, and diaphragm control is performed thereon in six stages by 1 AV, for example, a diaphragm value of F1.4 to F11. Meanwhile, FIG. 1 illustrates a case in which the diaphragm 14 is arranged between the pickup lens 12 and the imaging element 16. However, the present invention is not limited to such a case. There are cases in which the pickup lens 12 includes a plurality of lenses (or a plurality of lens groups) and the diaphragm 14 is arranged in the pickup lens 12.

An ND filter 15 (Neutral Density filter) is a device that reduces the amount of light which is incident to the imaging element 16, and can be inserted in the light path 13 through which the light fluxes which are incident to the imaging element 16 pass. Meanwhile, FIG. 1 illustrates a case in which the ND filter 15 is arranged between the pickup lens 12 and the imaging element 16. However, the present invention is not limited to such a case. There are cases in which the pickup lens 12 includes a plurality of lenses (or a plurality of lens groups) and the ND filter 15 is arranged in the pickup lens 12.

The ND filter 15 has an insertion state in which the ND filter 15 is inserted in the light path 13 using a filter swapping drive unit 33 and a non-insertion state in which the ND filter 15 is shifted from the light path 13. The number of ND filters 15 is not particularly limited. The ND filter 15 may include a plurality of (for example, five) filters.

The CPU 40 controls an exposure time (a charge storage time) in the imaging element 16 or the reading of an image signal in the imaging element 16 through an imaging element control unit 32. In addition, the CPU 40 controls pixel addition performed in the imaging element 16 through the imaging element control unit 32. In addition, the CPU 40 switches the insertion state and the non-insertion state of the ND filter 15 through the filter swapping drive unit 33. In addition, the CPU 40 controls the diaphragm 14 through the diaphragm drive unit 34.

Example of configuration of monocular 3D imaging element

Figure 2B:
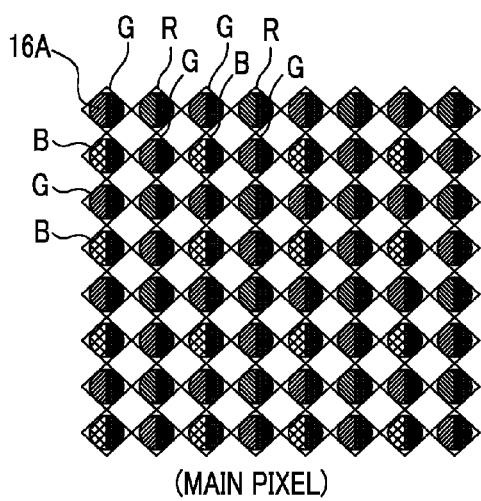
Figure 2C:
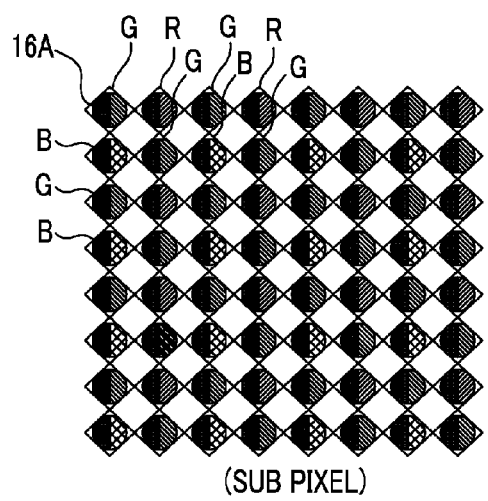

FIGS. 2A to 2C are views illustrating an example of the configuration of the imaging element 16.

The imaging element 16 includes imaging pixels in odd-numbered lines (hereinafter, referred to as "main pixels") and imaging pixels in even-numbered lines (hereinafter, referred to as "sub pixels") which are arranged in matrix, and it is possible to independently read image signals corresponding to two planes acquired through photoelectric conversion performed on each of the main and sub pixels.

As shown in FIGS. 2A to 2C, in the odd-numbered lines (1, 3, 5, . . . ) of the imaging element 16, among the pixels which respectively include R (red), G (green), and B (blue) color filters, pixel array lines GRGR . . . and pixel array lines BGBG . . . are alternately provided. On the other hand, in the pixels of the even-numbered lines (2, 4, 6, . . . ), the pixel array lines GRGR . . . and the pixel array lines BGBG . . . are alternately provided like the odd-numbered lines. Further, with respect to the pixels of the even-numbered lines, pixels are arranged to be shifted in the line direction by half pitch of an array pitch. That is, the pixel array of the imaging element 16 is a honeycomb array.

Figure 3:
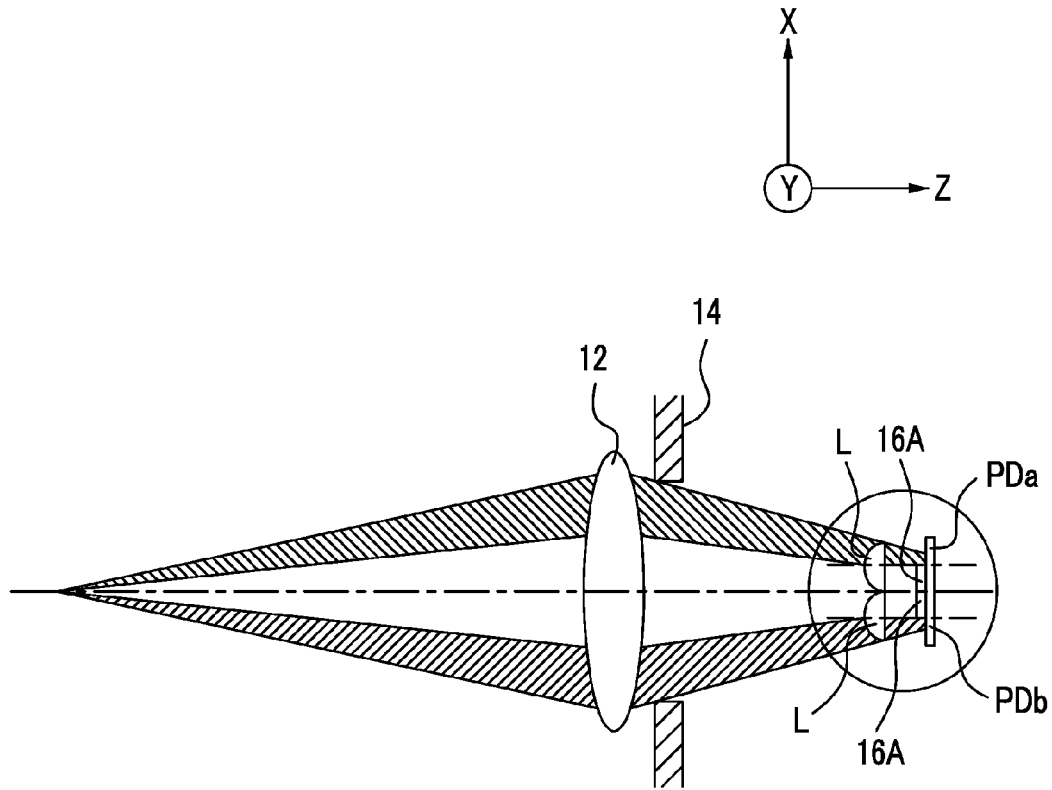
FIG. 3 is a view illustrating an imaging pixel.
Figure 4A:
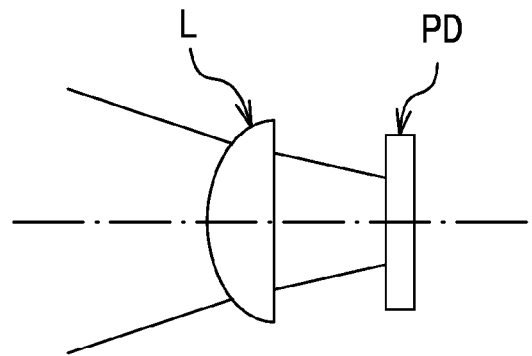
FIGS. 4A and 4B are enlarged views illustrating the main section of FIG. 3.
Figure 4B:
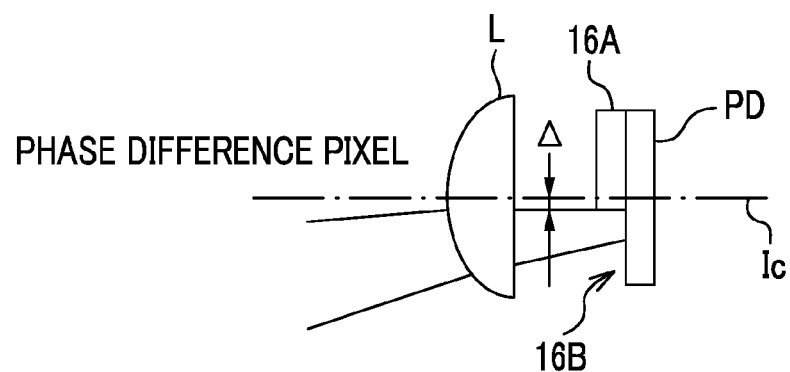

FIG. 3 is a view illustrating each pixel of the pickup lens 12, the diaphragm 14, and the single main pixel PDa and the single sub pixel PDb of the imaging element 16, and FIGS. 4A and 4B are enlarged views illustrating the main section of FIG. 3.

As shown in FIG. 4A, light fluxes which pass through an exit pupil are incident to the normal pixel (photodiode PD) of the imaging element through a micro lens L without limitation.

In contrast, a light blocking member 16A is formed on the main pixel PDa and the sub pixel PDb of the imaging element 16, and thus the right or left half of the light reception planes of the main pixel PDa and the sub pixel PDb is shaded due to the light blocking member 16A. That is, the light blocking member 16A has a function as a pupil division member. As shown in FIG. 4A, a main pixel PDa group and a sub pixel PDb group respectively include main pixels PDa and sub pixels PDb which are 2-dimensionally arranged. In the imaging element 16, the main pixel PDa and the sub pixel PDb are arranged adjacent to each other.

Also, in the imaging element 16 which is configured as described above, the main pixel PDa and the sub pixel PDb are configured so as to have different regions (the right half and the left half) in which light fluxes are restricted using the light blocking member 16A. However, the present invention is not limited thereto, and the light blocking member 16A may not be provided and the micro lens L and the photodiodes PDs (PDa and PDb) may be relatively shifted in the right and left directions, and thus light fluxes which are incident to the photodiode PD are restricted due to the shifted directions. In addition, a single micro lens is provided for two pixels (the main pixel and the sub pixel), and thus light fluxes which are incident to each of the pixels may be restricted.

Returning to FIG. 1, signal charge stored in the imaging element 16 is read as a voltage signal according to the signal charge in response to a read signal which is applied from the imaging element control unit 32. The imaging element 16 of this example has a function of pixel addition, and, when pixel addition is instructed based on the control of the CPU 40 through the imaging element control unit 32, the imaging element 16 performs pixel addition based on the instruction. In the case of DR mode, the charge (the pixel value) of the main pixel and the charge (the pixel value) of the sub pixel, which are exposed during different exposure times, are added. The voltage signal which is read from the imaging element 16 is applied to an analog signal processing unit 18. Here, the sampling of the R, G, and B signals of each of the pixels is held, the signals are amplified using gain (corresponding to ISO sensitivity) designated using the CPU 40, and then the resulting signals are applied to an A/D converter 20. The A/D converter 20 converts the sequentially input R, G, and B signals into digital R, G, B signals, and outputs the resulting signals to an image input controller 22.

A digital signal processing unit 24 performs an offset process, a gain control process including white balance correction and sensitivity correction, a gamma correction process, a synchronization process, a YC process, and a predetermined signal process, such as contrast emphasis or outline correction, on the digital image signals which are input through the image input controller 22.

In addition, an EEPROM 56 is a nonvolatile memory which stores a camera control program, defect information of the imaging element 16, various types of parameters or tables used for an image process, and program lines.

Here, as shown in FIGS. 2B and 2C, main pixel data which is read from the main pixels of the odd-numbered lines of the imaging element 16 is processed as the planar image of the left viewpoint (hereinafter, referred to as "left image"), and sub pixel data which is read from the sub pixels of the even-numbered line is processed as the planar image of a right viewpoint (hereinafter, referred to as "right image").

The left image and the right image, which are processed using the digital signal processing unit 24, are input to a VRAM 50. The VRAM 50 includes an A region and a B region each which stores 3D image data indicative of a 3D image of 1 frame. The 3D image data indicative of a 3D image of 1 frame is alternately written in the A region and the B region of the VRAM 50. In the A region and the B region of the VRAM 50, the written 3D image data is read from a region other than the region in a side in which the 3D image data is written. The 3D image data, which is read from the VRAM 50, is encoded in a video encoder 28 and output to a liquid crystal monitor (LCD) 30 for stereoscopic display which is provided on the rear plane of a camera, and thus a 3D subject image is displayed on the display screen of the liquid crystal monitor 30.

The liquid crystal monitor 30 is stereoscopic display unit which can display the stereoscopic image (the left image and the right image) as directional images, each having directivity, using parallax barriers. However, the present invention is not limited thereto. The left image and the right image can be individually seen by wearing glasses using a lenticular lens or dedicated glasses such as polarized glasses or liquid crystal shutter glasses.

In addition, if the first stage push (half-push) of the shutter button of the operation unit 38 is performed, the imaging element 16 starts an AF operation and an AE operation, and performs control in order to move a focal lens in the pickup lens 12 to a focused position through the lens drive unit 36. In addition, during the half-push of the shutter button, the image data which is output from the A/D converter 20 is loaded to an AE detection unit 44.

The AE detection unit 44 integrates the G signals of the whole screen or integrates the G signals which are differently weighted between the central portion and the peripheral portion of the screen, and outputs the integrated value (the AE evaluation value) to the CPU 40.

An AF processing unit 42 is a section which performs a contrast AF process or a phase AF process. When the contrast AF process is performed, the AF processing unit 42 extracts the high-frequency components of the image data in the predetermined focus region of at least one of the left image data and the right image data, and calculates an AF evaluation value indicative of a focusing state in such a way as to integrate the high-frequency components. The AF control is performed by controlling the focal lens in the pickup lens 12 in order to cause the AF evaluation value to be the maximum value. In addition, when the phase difference AF process is performed, the AF processing unit 42 detects the phase difference of the image data corresponding to the main pixel and the sub pixel in the predetermined focus region of the left image data and the right image data, and acquires the amount of defocusing based on information indicative of the phase difference. The AF control is performed by controlling the focal lens in the pickup lens 12 in order to cause the amount of defocusing to be 0. When the AF control is being performed, the AF processing unit 42 calculates the subject distance of the focused subject.

If the AE operation and the AF operation are terminated and the second-stage push (full-push) of the shutter button is performed, data for two pieces of images of the left image and the right image, which correspond to the main pixel and the sub pixel output from the A/D converter 20 in response to the second-stage push, is input to a memory (SDRAM) 48 from the image input controller 22, and temporarily stored.

The data for two pieces of images, which is temporarily stored in the memory 48, is appropriately read using the digital signal processing unit 24. Here, a predetermined signal process, including a generation process (YC process) of the brightness data and the color difference data of the image data, is performed. The image data (YC data) on which the YC process is performed is stored in the memory 48 again. Subsequently, two pieces of YC data are respectively output to a compression/extension processing unit 26, and a predetermined compression process, such as Joint Photographic Experts Group (JPEG), is performed thereon. Thereafter, the resulting data is stored in the memory 48 again.

A Multi-Picture file (an MP file: a file in the form in which a plurality of images are connected) is generated based on the two pieces of YC data (compression data) in the memory 48. The MP file is read using a media I/F 52 and stored in a recording media 54.

Subsequently, the present invention will be divided into first to third embodiments and described below.

First Embodiment

FIG. 5 is a block diagram illustrating the details of the main section of the image capturing device 10. Meanwhile, in FIG. 5, the same reference numerals are used for the components shown in FIG. 1, and the descriptions of the units which are previously described are omitted below.

In an image capturing device 10 according to the embodiment, a CPU 40 includes a pickup mode setting control unit 62, an AE control unit 64, an AF control unit 66, a pickup execution control unit 68, and a diaphragm control unit 70.

The pickup mode setting control unit 62 receives pickup mode setting operation using the operation unit 38, and stores the received pickup mode in the memory 48.

The pickup mode includes a 3D pickup mode in which a 3D image (a stereoscopic image) is acquired and a 2D pickup mode in which a 2D image (a planar image) is acquired. In addition, the 2D pickup mode includes a DR mode (a DR pickup mode) and an SN mode (an SN pickup mode).

In the DR (wide dynamic range) mode, the main pixels and the sub pixels of the imaging element 16 are exposed during different exposure times, and the charges (pixel values) of the plurality of pixels which have different exposure times are added. According to the pixel addition performed in DR mode, a wide dynamic range 2D image (DR image) can be acquired even in a bright pickup scene. That is, DR mode is a special 2D pickup mode, is different from the 2D pickup mode (2D normal mode) in which a pixel value of one of the main pixel group and the sub pixel group is used, and generates a 2D image using pixel values (pixel data) of both the main pixel group and the sub pixel group.

In the SN (noise reduction) mode, the main pixels and the sub pixels of the imaging element 16 are exposed during the same exposure time, and charges (pixel values) of the plurality of pixels each having the same exposure time are added. According to the pixel addition performed in the SN mode, a bright image (for example, a 3D image) can be acquired even in a dark pickup scene. If the gain up (amplification) of a signal is performed instead of the pixel addition performed in the SN mode, noise accompanying the gain up increases. However, in the SN mode, since the charges of the plurality of pixels each having the same exposure time are added, there is less noise and a bright image can be acquired. In addition, in the SN mode, since pixel addition is performed on pixels having the same exposure time, the effects of the image formation shift (spurious resolution) are solved.

The AE control unit 64 performs AE control under the control of the diaphragm control unit 70 which will be described later, calculates an EV value (subject brightness) based on the integrated value which is output from the AE detection unit 44, determines the diaphragm value of the diaphragm 14 based on the EV value, whether or not the ND filter 15 is inserted (insertion state/non-insertion state), and the shutter speed of the imaging element 16 under the control of the diaphragm control unit 70, controls the diaphragm 14 through the diaphragm drive unit 34 based on the determined diaphragm value, switches the insertion state/non-insertion state of the ND filter 15 through the filter swapping drive unit 33 based on the determination of whether or not the ND filter 15 is inserted, and controls the exposure time (the charge storage time) in the imaging element 16 through the imaging element control unit 32 based on the determined shutter speed.

The AF control unit 66 performs a contrast AF process or a phase difference AF process by controlling the AF processing unit 42. Further, the AF control unit 66 acquires the subject distance of the focused subject from the AF processing unit 42 while the AF control is being performed.

The pickup execution control unit 68 controls the charge storage and the reading of charge (pixel data) in the imaging element 16 through the imaging element control unit 32, and acquires the left image including the pixel data of the main pixel group and the right image including the pixel data of the sub pixel group.

In addition, the pickup execution control unit 68 controls the imaging element 16 through the imaging element control unit 32, and performs addition on the pixel values of the main pixels and the sub pixels (main and sub pixel addition) using the imaging element 16.

In the case of pickup in the 3D normal mode, the pickup execution control unit 68 images a subject using the imaging element 16, acquires a 3D image (a stereoscopic image) including a left image group and a right image group, and records the 3D image in the recording media 54 through the media I/F 52. In the case of pickup in the SN mode, the pickup execution control unit generates a 3D image in which pixel addition is performed on the main pixels and the sub pixels, and records the generated 3D image in the recording media 54.

In the case of pickup in the SN mode, the pickup execution control unit 68 generates a piece of noise reduced planar image by performing pixel addition on the pixel data of the main pixel group and the pixel data of the sub pixel group in such a way as to expose the main pixel group and the sub pixel group of the imaging element 16 during the same exposure time, and records the generated image in the 3D image in the recording media 54 through the media I/F 52. In the case of pickup in DR mode, the pickup execution control unit 68 generates a wide dynamic range planar image (a wide dynamic range image) by performing pixel addition on the pixel data of the main pixel group and the pixel data of the sub pixel group in such a way as to expose the main pixel group and the sub pixel group of the imaging element 16 during different exposure times, and records the generated image in the recording media 54 through the media I/F 52.

The diaphragm control unit 70 switches the diaphragm value (F value) of the diaphragm 14 using the diaphragm drive unit 34 based on the instruction of the pickup execution control unit 68. In addition, the diaphragm control unit 70 switches the insertion state and the non-insertion state of the ND filter 15 using the filter swapping drive unit 33 based on the instruction of the pickup execution control unit 68. The insertion state is a state in which the ND filter 15 is inserted in the light path 13 (on the optical axis), and the non-insertion state is a state in which the ND filter 15 is shifted from the light path 13. Meanwhile, the number of ND filters 15 may be plural. When the number of ND filters is plural, the number of ND filters which are inserted is controlled.

In the case of pickup in the SN mode, the diaphragm control unit 70 causes the diaphragm device to be an open state (the diaphragm value is set to the minimum value), and controls whether to set the ND filter 15 to be the insertion state, in which the ND filter 15 is inserted in the light path 13 from the pickup lens 12 to the imaging element 16 or the non-insertion state based on the subject brightness acquired using the AE control unit 64.

In addition, in the case of pickup in DR mode, the diaphragm control unit 70 according to the embodiment causes the diaphragm value of the diaphragm 14 to be greater than the diaphragm value in the case of pickup of the stereoscopic image (in this example, SN mode), and sets the ND filter 15 to the non-insertion state.

FIG. 6 is a flowchart illustrating the flow of an example of the imaging process according to the first embodiment. The process is performed using the CPU 40 according to a program.

In Step S2, the AE control unit 64 performs the AE process. In the AE process, the subject brightness (the EV value) is calculated.

In Step S4, the AF control unit 66 performs the AF (Auto Focus) process. In the AF process, the subject distance of the focused subject is acquired.

In Step S6, the pickup mode is determined.

Meanwhile, although there are various types of pickup modes of the image capturing device 10, the pickup mode is limited to the DR mode and the SN mode in order to facilitate understanding of the features of the present invention, and the description thereof is given below. Meanwhile, in the SN mode of this example, a 3D image using pixel addition is generated.

When the pickup mode is the SN mode, the process proceeds to Step S8. When the pickup mode is the DR mode, the process proceeds to Step S14.

In the case of the SN mode, it is determined whether or not the subject brightness which is acquired using the AE control unit 64 is greater than a threshold Tev in Step S8.

When the subject brightness is greater than the threshold Tev (when it is bright), the diaphragm control unit 70 causes the diaphragm 14 to be open using the diaphragm drive unit 34, and sets the ND filter 15 to the insertion state using the filter swapping drive unit 33 in Step S10.

When the subject brightness is equal to or less than the threshold Tev (when it is dark), the diaphragm control unit 70 causes the diaphragm 14 to be open using the diaphragm drive unit 34, and sets the ND filter 15 to the non-insertion state using the filter swapping drive unit 33 in Step S12.

In the case of the DR mode, the diaphragm control unit 70 sets the diaphragm value (the F value) of the diaphragm 14 to a value which is equal to or greater than a prescribed value through the diaphragm drive unit 34, and sets the ND filter 15 to the non-insertion state using the filter swapping drive unit 33 in Step S14.

Here, the prescribed value of the diaphragm value is a diaphragm value which causes spurious resolution attributable to parallax to be included in a permitted range by causing the image formation positions of the same subject to be closer compared to the 3D pickup in the left image and the right image. Meanwhile, the prescribed value differs depending on a subject distance, a focal distance, a stereoscopic environment (the size of the display screen, the resolution of the display screen, or an observation distance), or the stereoscopic fusion limit of a user. The prescribed value is a value which causes the diaphragm value of the diaphragm 14 to be greater compared to the cases of the SN mode and the 3D pickup.

The diaphragm control unit 70 squeezes the opening of the diaphragm 14, for example, by one or more stages. The diaphragm control unit 70 sets the diaphragm value which is greater by one or more stages compared to the case of pickup in the SN mode (opening) such that, for example, the diaphragm value is set to a value which is equal to or greater than F4 when the opening is F2.8, and the diaphragm value is set to a value which is equal to or greater than F8 when the opening is F5.6. When the subject brightness is high (bright), it is preferable to squeeze the diaphragm by two or more stages.

In Step S16, the pickup execution control unit 68 controls the exposure of the imaging element 16 through the imaging element control unit 32. In the case of the DR mode, the main pixels and the sub pixels are exposed during different exposure times, and pixel addition is performed on the main pixels and the sub pixels. In the case of the SN mode, all the pixels are exposed during the same exposure time, and pixel addition is performed.

In Step S18, the pickup execution control unit 68 controls the reading of the pixel data (charge) from the main pixels and the sub pixels of the imaging element 16 through the imaging element control unit 32. The read signal is converted from an analog signal into a digital signal using the A/D converter 20.

In Step S20, a predetermined digital signal process is performed on the left image and the right image using the digital signal processing unit 24.

In Step S22, image compression is performed using the compression/extension processing unit 26.

In Step S24, the 3D image or the 2D image (in this example, the 2D image in the DR mode or the 2D image in the SN mode) is recorded in the recording media 54 using the media I/F 52.

In the pickup in the DR mode according to the first embodiment, squeezing is necessarily performed using the diaphragm 14 (the diaphragm device). In the related art, light fluxes from the same subject pass through different pupil positions of the pickup lens 12 and the images of the same subject are formed on different positions of the imaging element 16, and thus gradation collapse occurs in a 2D image on which pixel addition is performed. However, in the image capturing device 10 according to the embodiment, squeezing is performed using the diaphragm 14 (the diaphragm device) and image formation positions are close, and thus gradation collapse is solved. In addition in the SN mode, it is controlled whether or not to set the ND filter 15 to the insertion state based on the subject brightness while the diaphragm 14 (the diaphragm device) is open, and thus brightness can be adjusted.

Although the DR mode and the SN mode have been described above, it is apparent that pickup may be performed in other modes.

Meanwhile, in the SN mode, a configuration may be used in which whether or not to set the ND filter 15 to the insertion state or whether or not to squeeze the diaphragm 14 can be switched based on the input set using the operation unit 38.

Second Embodiment

Subsequently, an image capturing device according to a second embodiment will be described with reference to FIG. 5. Meanwhile, hereinafter, units which are different from those in the first embodiment will be mainly described, and the descriptions of the units which are previously described in the first embodiment are omitted.

In the case of pickup in the DR mode, the diaphragm control unit 70 according to the embodiment controls whether or not to set the ND filter 15 to the insertion state based on the subject distance of a main subject which is acquired using the AF control unit 66. For example, in the case of pickup in the DR mode, when the subject distance of the focused main subject is greater than a threshold Ts (when the main subject is far), the diaphragm 14 is set to the open state (the diaphragm value is set to the minimum value). When the subject distance of the focused main subject is equal to or less than the threshold Ts (the main subject is close), the diaphragm value of the diaphragm 14 is increased to the prescribed value and the ND filter 15 is set to the non-insertion state.

FIG. 7 is a flowchart illustrating the flow of the imaging process according to the second embodiment.

Steps S2 to S12 are the same as in the first embodiment.

In the case of the DR mode, the diaphragm control unit 70 determines whether or not the subject distance of the main subject which is acquired using the AF control unit 66 is greater than the threshold Ts in Step S13*a*.

When the subject distance is equal to or less than the threshold Ts (when the main subject is close), the process proceeds to Step S14. When the subject distance is greater than the threshold Ts (when the main subject is far), the process proceeds to Step S15.

Step S14 is the same as in the first embodiment. That is, the diaphragm control unit 70 sets the diaphragm value (the F value) of the diaphragm 14 to a value which is equal to or greater than the prescribed value using the diaphragm drive unit 34, and sets the ND filter 15 to the non-insertion state using the filter swapping drive unit 33.

In S15, the diaphragm control unit 70 sets the diaphragm 14 to the open state using the diaphragm drive unit 34, and switches over whether or not to set the ND filter 15 to the insertion state using the filter swapping drive unit 33 based on the subject brightness.

As described above, in this embodiment, when the subject distance of the focused subject is large (the subject is far), image formation shift between the left image and the right image decreases, and thus the diaphragm 14 is set to the open state even in the DR mode. When the diaphragm is set to be small, image quality is deteriorated due to diffraction. However, the ND filter 15 is inserted and the ND filter 15 is set to the open state (the diaphragm value is set to the minimum value), and thus the deterioration of image quality due to diffraction is prevented. In addition, pickup in which the depth of field is uniformly maintained can be performed. Meanwhile, when the subject distance is small, the affects of the above-described spurious resolution increase, and thus the diaphragm 14 may be squeezed while diffraction is permitted.

Meanwhile, although the case in which the subject distance is acquired in association with the AF control using the AF control unit 66 is described as an example, the present invention is not particularly limited to such a case. For example, the subject distance may be directly detected using a distance sensor.

Third Embodiment

Subsequently, an image capturing device according to a third embodiment will be described with reference to FIG. 8. Meanwhile, hereinafter, units which are shown in FIGS. 5 and 6 and are different from those in the first embodiment will be mainly described, and the descriptions of the units which are previously described in the first embodiment are omitted.

Figure 8:
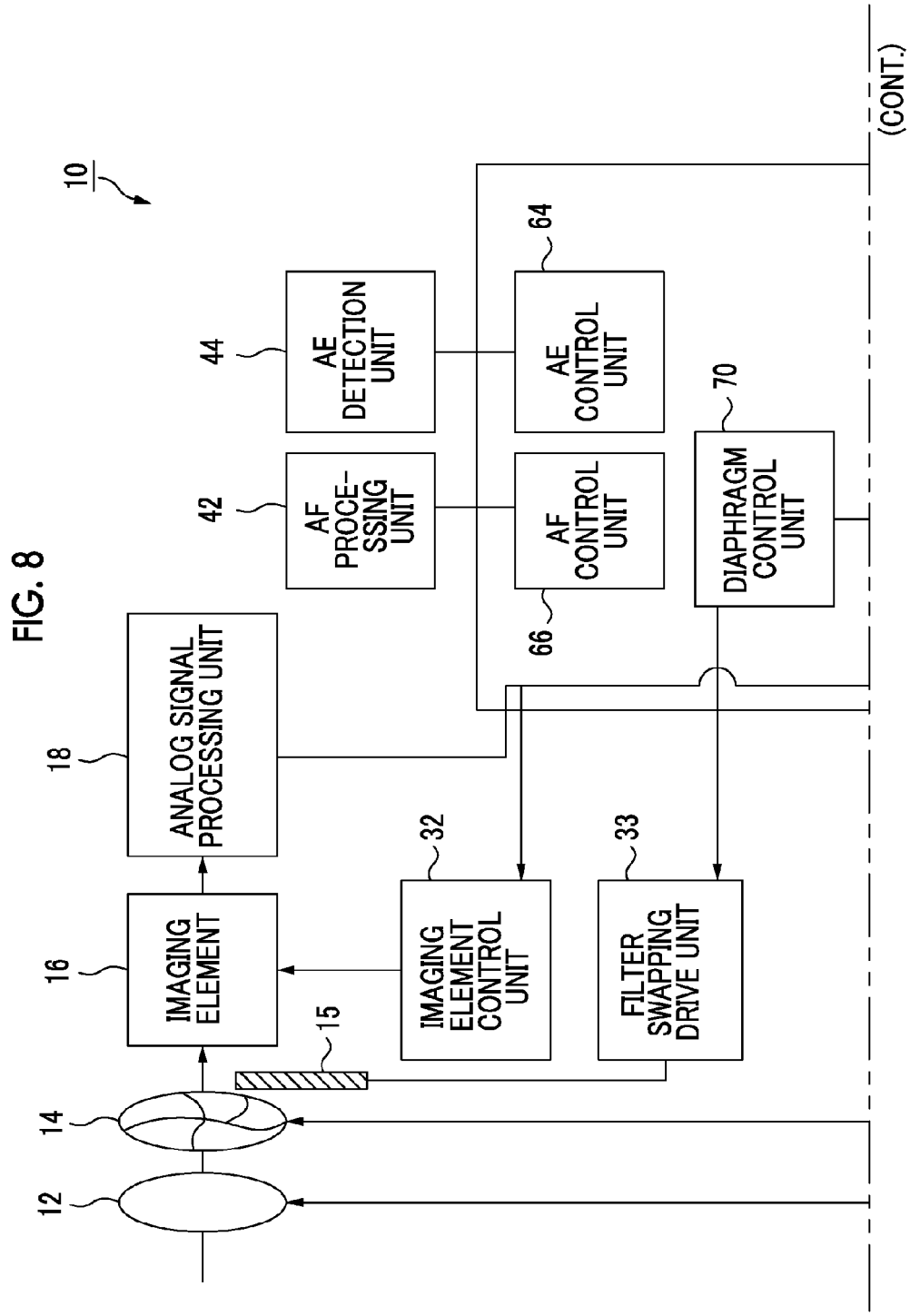
FIG. 8 is a block diagram illustrating the main section of the image capturing device according to the third embodiment.

FIG. 8 is a block diagram illustrating the main section of the image capturing device 10 according to the third embodiment. Meanwhile, in FIG. 8, the same reference numerals are used for the components which are shown in FIGS. 1 and 5.

The pickup lens 12 includes a zoom lens, and the focal distance acquisition unit 72 acquires the focal distance of the pickup lens 12.

In the case of pickup in the DR mode, the diaphragm control unit 70 according to the embodiment controls whether or not to set the ND filter 15 to the insertion state based on the focal distance of the pickup lens 12 which is acquired using the focal distance acquisition unit 72. For example, in the case of pickup in the DR mode, when the focal distance is greater than the threshold Tz (the focal distance is long), the diaphragm value of the diaphragm 14 is increased to the prescribed value and the ND filter 15 is set to the non-insertion state. When the focal distance is equal to or less than the threshold Tz (the focal distance is short), the diaphragm 14 is set to the open state (the diaphragm value is set to the minimum value).

Figure 9:
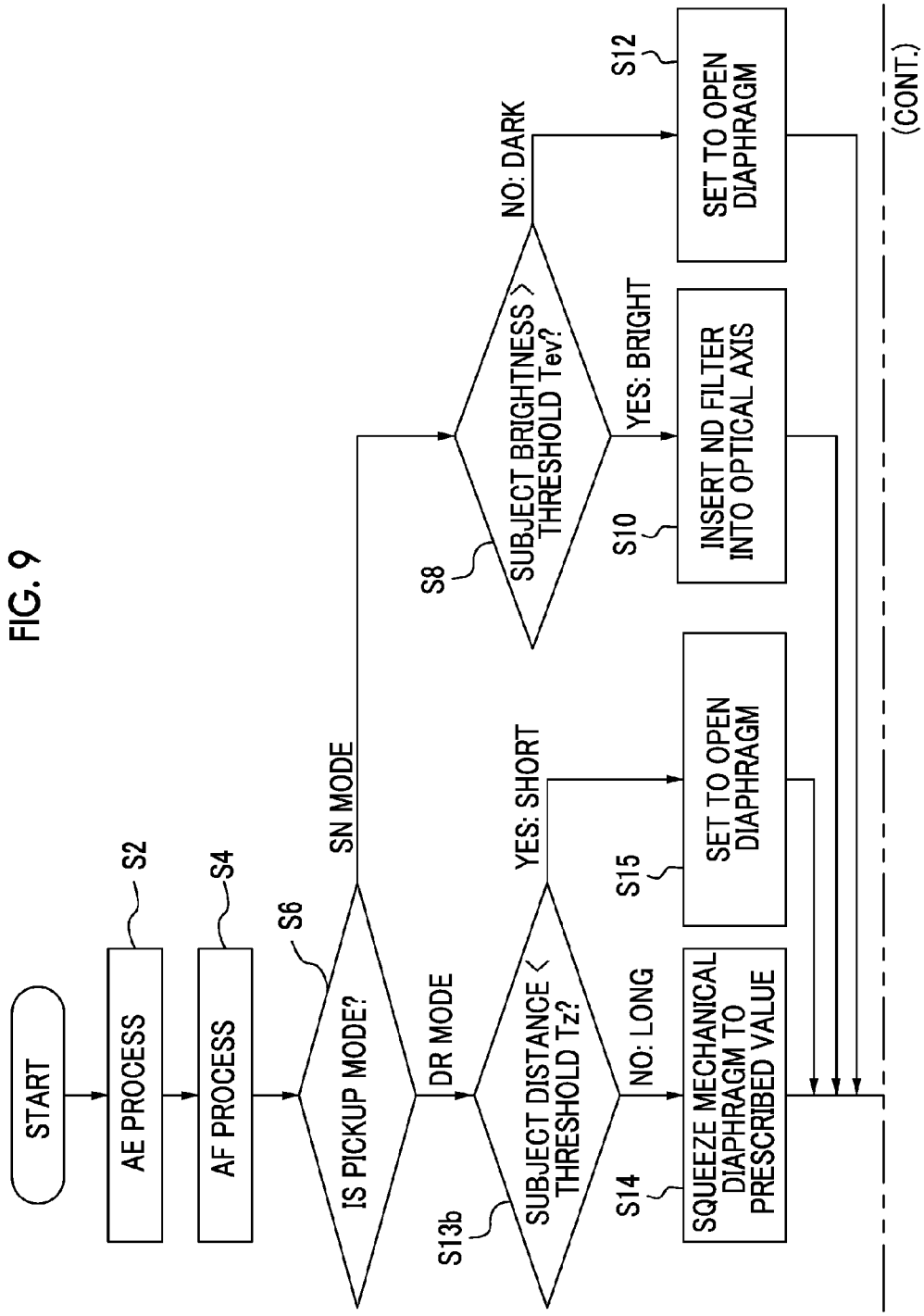
FIG. 9 is a flowchart illustrating the flow of an imaging process example according to the third embodiment.

FIG. 9 is a flowchart illustrating the flow of the imaging process according to the third embodiment.

Steps S2 to S12 are the same as in the first embodiment.

In the case of the DR mode, it is determined whether or not the focal distance of the pickup lens 12 acquired using the focal distance acquisition unit 72 is greater than the threshold Tz in Step S13b.

When the focal distance is greater than the threshold Tz (when the focal distance is long), the process proceeds to Step S14. When the focal distance is equal to or less than the threshold Tz (when the focal distance is short), the process proceeds to Step S15.

Steps S14 to S24 are the same as in the first embodiment.

In this embodiment, when the focal distance of the pickup lens 12 is short, a shift in image formation between the left image and the right image decreases, and thus the diaphragm 14 is set to the open state (the diaphragm value is set to the minimum value) even in the DR mode, thereby performing light extinction using the ND filter 15. Therefore, pickup in which the depth of field is uniformly maintained can be performed.

Meanwhile, a focal distance acquisition aspect is not particularly limited. The movement of the zoom lens of the pickup lens 12 may be used to directly detect the focal distance, the focal distance may be acquired by observing the drive signal of the lens drive unit 36 used to drive the zoom lens, and the focal distance may be acquired using the image process.

Radiation Mode Setting Process

Figure 10:
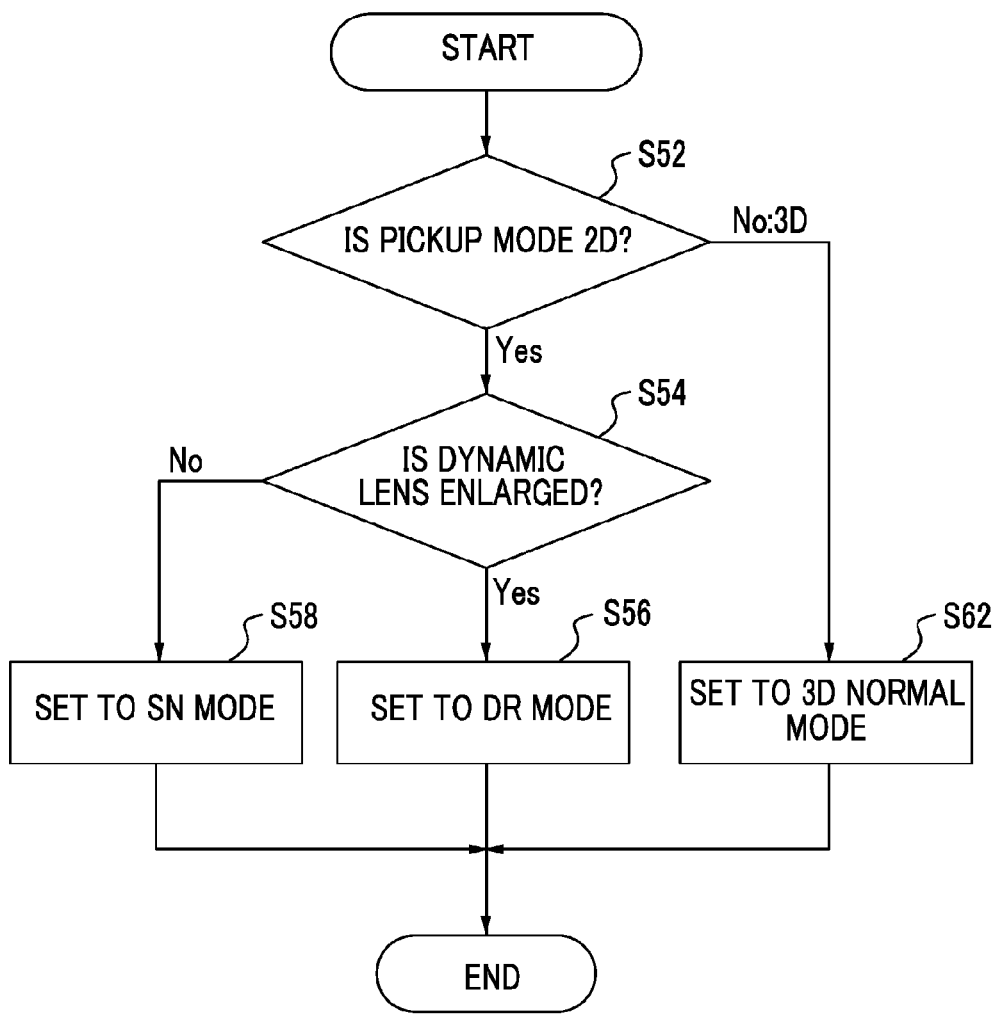
FIG. 10 is a flowchart illustrating a pickup mode setting process.
Figure 12A:
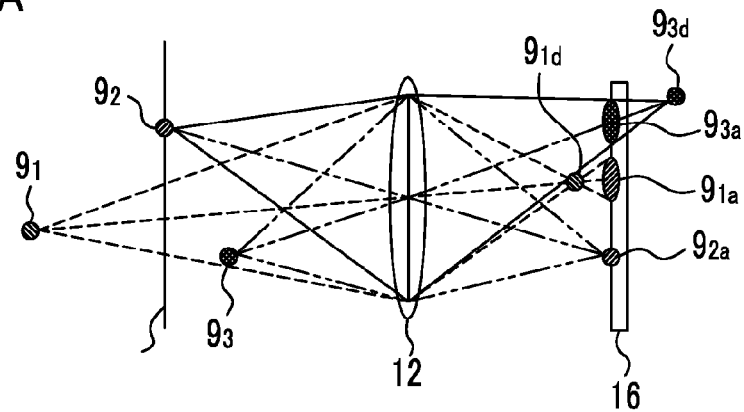
FIGS. 12A to 12C are explanatory views illustrating the problems of the present invention, that is.
Figure 12B:
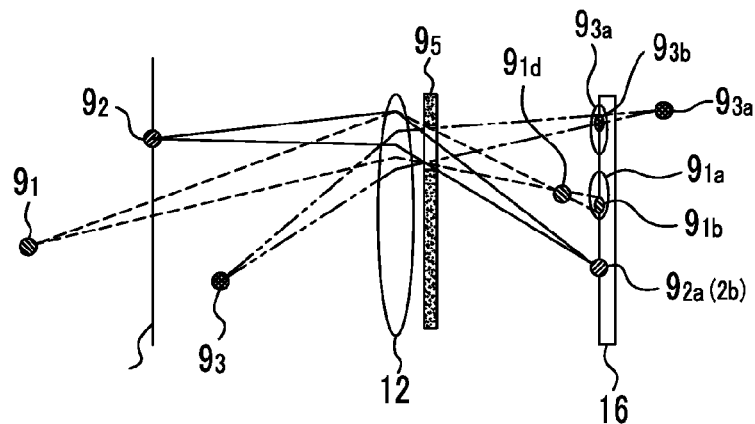
Figure 12C:
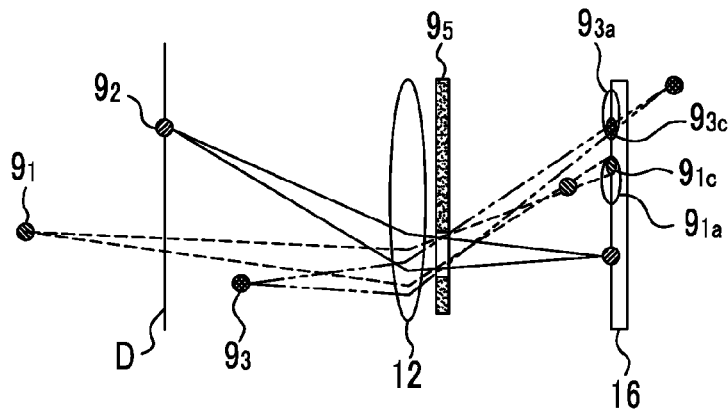

FIG. 10 is a flowchart illustrating a pickup mode setting process which is common from the first to third embodiments. The process is performed using the pickup mode setting control unit 62.

If power is turned on, the image capturing device 10 is at a standby state. At the standby state, a pickup mode input setting operation can be received using the operation unit 38.

First, the setting instruction of the 2D pickup mode or the 3D pickup mode is determined in Step S52.

In a case of the selection instruction of the 2D pickup mode, setting instruction operation used to determine whether or not perform dynamic range expansion is received. When the setting instruction operation is determined to be the dynamic range expansion in Step S54, that is, in a case of "Yes", the DR mode is set in Step S56. In a case of "No", the SN mode is set in Step S58.

In a case of the selection instruction of the 3D pickup mode, a 3D normal mode is set in Step S62.

The DR mode and the SN mode are as described in the first embodiment, and pixel addition is performed when each pickup is performed. In the 3D normal mode, the stereoscopic image which includes the left image and the right image is recorded without performing pixel addition.

Meanwhile, although a case in which a selection instruction operation for the DR mode or the SN mode is received has been described as an example, the present invention is not limited to such a case and the DR mode or the SN mode may be automatically set. For example, when a live view image (a through image) is displayed, subject brightness is acquired. In the case of the 2D pickup mode and when the subject brightness is bright and the dynamic range is equal to or less than the threshold value, the DR mode may be automatically selected.

In addition, the pickup mode is not particularly limited to the modes shown in FIG. 10 and it is apparent that other modes may be provided. For example, a mode in which a high-resolution 2D image, the resolution of which is higher than that of each viewpoint image (the left image or the right image), is generated may be provided.

Meanwhile, in the present invention, the pupil division method is not particularly limited to the aspect in which the light blocking member 16A for pupil division shown in FIGS. 3 to 4B is used. For example, an aspect in which pupil division is performed based on the arrangement or shape of at least one of the micro lens L and the photodiode PD may be used, and an aspect in which pupil division is performed using the mechanical diaphragm 14 may be used. The other aspects may be used.

In addition, the imaging element 16 is not particularly limited to a CCD imaging element. For example, the imaging element 16 may be a CMOS imaging element.

Figures 11A, 11B:
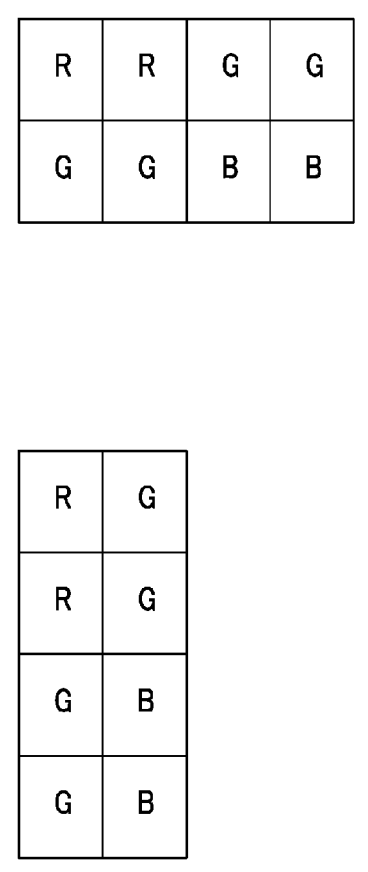

In addition, the array of imaging pixels of the imaging element 16 is not limited to such a case of the honeycomb array shown in FIG. 2. The array may be Bayer array a part of which is schematically shown in FIG. 11A or 11B. In detail, the array is a double Bayer array in which both a pixel array (main pixel array) as a whole even-numbered line and a pixel array (sub pixel array) as a whole odd-numbered line are Bayer arrays. In FIGS. 11A and 11B, R, G, and B are imaging pixels which have red, green, and blue filters, respectively. A pixel pair is configured with two pixels (that is, adjacent same color pixels) R-R, G-G, and B-B which are adjacent to each other. The pixel of the left image is configured using the pixel data of the one side of the pixel pair, and the pixel of the right image is configured using the pixel data of the other side of the pixel pair.

In addition, although the case in which pixel addition in the DR mode or the SN mode is performed in the imaging element 16 has been described as an example, the present invention is not limited to such a case. The present invention can be applied to a case in which pixel addition is performed in a place other than the imaging element 16. That is, in the DR mode, pixel addition may be performed after the left image and the right image which are imaged during different exposure times are acquired from the imaging element 16. In the case of the SN mode, pixel addition may be performed in a place other than the imaging element 16.

In addition, in the above-described first embodiment, the prescribed value of the diaphragm 14 is calculated using the CPU 40 based on calculation conditions, for example, a monitor size (the size of a display screen), monitor resolution (the resolution of the display screen), an observation distance (a distance to view the display screen), and the stereoscopic fusion limit of a user (there are individual differences). The setting of these calculation conditions may include both user setting and automatic setting. In the case of the user setting, a setting operation is performed using the operation unit 38, and the content of the setting is stored in the EEPROM 56. Information about the monitor size and the monitor resolution (the resolution of the display screen) may be automatically acquired from a monitor (the LCD 30 in FIG. 1) or the like. In addition, a standard condition may be applied to a calculation condition on which the user setting is not performed (or a calculation condition which cannot be automatically acquired).

Figure 14:
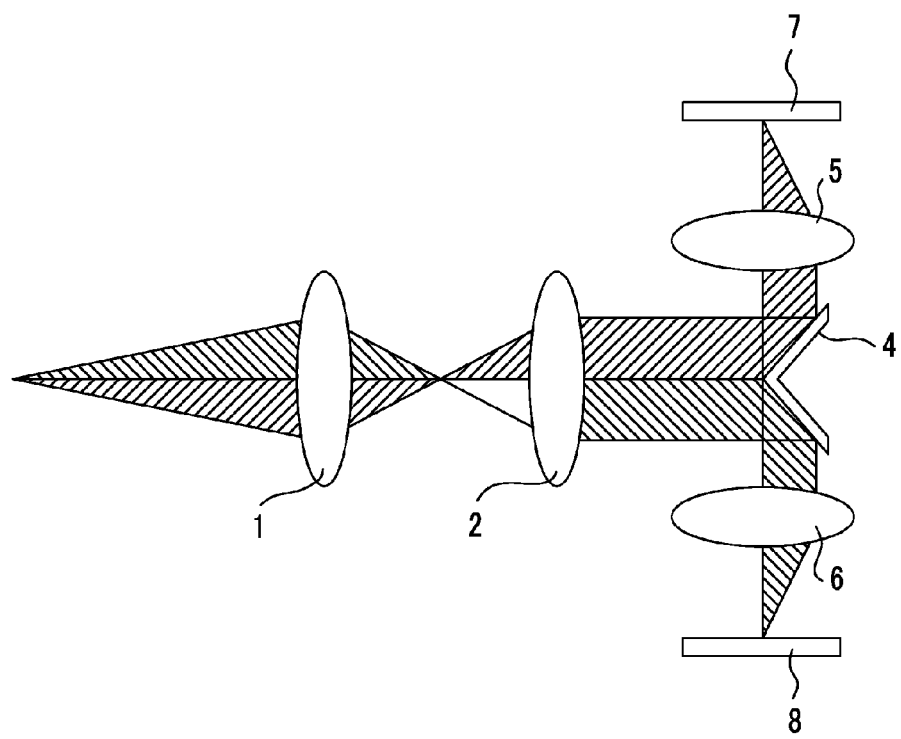
FIG. 14 is an explanatory view illustrating another example of pupil division.

In addition, pupil division is not particularly limited to such a case in which the imaging element 16 (the structure in which main pixels and sub pixels are arranged to approach each other) is used as shown in FIGS. 2A to 4B. For example, as shown in FIG. 14, pupil division may be performed on light fluxes, which pass through different regions, that is, the left and right regions of a main lens 1 and a relay lens 2, using a mirror 4, and images may be formed on imaging elements 7 and 8 through respective image formation lenses 5 and 6. That is, an image capturing device, which includes the first imaging element 7 having a first pixel group and the second imaging element 8 having a second pixel group, which respectively receive light fluxes on which pupil division is performed using an optical member (mirror 4), may be used. The present invention can be applied to the configuration shown in FIG. 14.

The present invention is not limited to the examples described in the present specification or the examples shown in the drawings, and it is apparent that various types of changes or improvements may be performed on designs in the range without departing from the gist of the present invention.

What is claimed is:

1. An image capturing device which includes a single optical pickup system and an imaging element that has a first pixel group and a second pixel group which respectively perform photoelectric conversion on light fluxes passing through different regions of the single optical pickup system, and which is capable of generating an image including pixel data of the first pixel group and pixel data of the second pixel group by imaging the same scene using the first pixel group and the second pixel group, the image capturing device comprising:

pickup mode setting unit that receives input setting of either a first plane pickup mode or second plane pickup mode in which a planar image is acquired by performing pixel addition on the pixel data of the first pixel group and the pixel data of the second pixel group;

pickup execution control unit that acquires a planar image by performing pixel addition on the pixel data of the first pixel group and the pixel data of the second pixel group in such a way as to expose the first pixel group and the second pixel group of the imaging element during a same exposure time in a case of pickup in the first plane pickup mode, and acquires a wide dynamic range planar image by performing pixel addition on the pixel data of the first pixel group and the pixel data of the second pixel group in such a way as to expose the first pixel group and the second pixel group of the imaging element during different exposure times in a case of pickup in the second plane pickup mode;

a diaphragm device that is arranged in a light path through which the light fluxes which are incident to the imaging element pass; and diaphragm control unit that, in a case of pickup in the second plane pickup mode, sets a diaphragm value of the diaphragm device to a value which is greater than a diaphragm value in a case of pickup in the first plane pickup mode.

2. The image capturing device according to claim 1, wherein the first pixel group and the second pixel group include light reception elements which are 2-dimensionally arranged, and wherein, in the imaging element, each pixel of the first pixel group and each pixel of the second pixel group are arranged adjacent to each other.

3. The image capturing device according to claim 1, further comprising:

an optical member that performs division on the light fluxes passing through the optical pickup system, wherein the imaging element includes a first imaging element having the first pixel group and a second imaging element having the second pixel group, respectively receiving the light fluxes acquired through pupil division performed using the optical member.

4. The image capturing device according to claim 1, wherein the diaphragm control unit sets the diaphragm device to an open state in the case of pickup in the first plane pickup mode.

5. The image capturing device according to claim 1, further comprising:
   a neutral density filter that is capable to be inserted in the light path through which the light fluxes which are incident to the imaging element pass; and
   subject brightness acquisition unit that acquires subject brightness,
   wherein the diaphragm control unit, in the case of pickup in the first plane pickup mode, controls whether or not to insert the neutral density filter into the light path based on the subject brightness acquired using the subject brightness acquisition unit.

6. The image capturing device according to claim 1, further comprising:
   subject distance acquisition unit that acquires a subject distance,
   wherein the diaphragm control unit, in the case of pickup in the second plane pickup mode, switches whether or not to set the diaphragm device to the open state based on the subject distance acquired using the subject distance acquisition unit.

7. The image capturing device according to claim 6,
   wherein, in the case of pickup in the second plane pickup mode and when the subject distance is greater than a threshold, the diaphragm control unit sets the diaphragm device to the open state.

8. The image capturing device according to claim 1, further comprising:
   focal distance acquisition unit that acquires a focal distance of the optical pickup system,
   wherein the diaphragm control unit, in the case of pickup in the second plane pickup mode, switches whether or not to set the diaphragm device to the open state based on the focal distance acquired using the focal distance acquisition unit.

9. The image capturing device according to claim 8,
   wherein the diaphragm control unit, in the case of pickup in the second plane pickup mode and when the focal distance is equal to or less than the threshold, sets the diaphragm device to the open state.

10. The image capturing device according to claim 6,
    wherein the diaphragm control unit, in the case of pickup in the second plane pickup mode and when the diaphragm device is set to the open state, switches whether or not to set the neutral density filter to an insertion state based on the subject brightness.

11. An image capturing method using the image capturing device according to claim 1 for acquiring a planar image including pixel data of a first pixel group and pixel data of a second pixel group by imaging a same scene with the first pixel group and the second pixel group using a single optical pickup system, an imaging element that has the first pixel group and the second pixel group which respectively perform photoelectric conversion on light fluxes passing through different regions of the single optical pickup system, and a diaphragm device that is arranged in a light path through which the light fluxes which are incident to the imaging element pass, the image capturing method comprising:
    receiving input setting of either a first plane pickup mode or a second plane pickup mode in which a planar image is acquired by performing pixel addition on the pixel data of the first pixel group and the pixel data of the second pixel group;
    in a case of pickup in the second plane pickup mode, setting a diaphragm value of the diaphragm device to a value which is greater than a diaphragm value in a case of pickup in the first plane pickup mode; and
    acquiring the planar image by performing pixel addition on the pixel data of the first pixel group and the pixel data of the second pixel group in such a way as to expose the first pixel group and the second pixel group of the imaging element during a same exposure time in a case of pickup in the first plane pickup mode, and acquiring a wide dynamic range planar image by performing pixel addition on the pixel data of the first pixel group and the pixel data of the second pixel group in such a way as to expose the first pixel group and the second pixel group of the imaging element during different exposure times in a case of pickup in the second plane pickup mode.

12. The image capturing method according to claim 11, further comprising:
    setting the diaphragm device to an open state in the case of pickup in the first plane pickup mode.

13. The image capturing method according to claim 11, further comprising:
    in the case of pickup in the first plane pickup mode, controlling whether or not to insert a neutral density filter into the light path based on the subject brightness acquired using the subject brightness acquisition unit by using the neutral density filter that is capable to be inserted in the light path through which the light fluxes which are incident to the imaging element pass and subject brightness acquisition unit that acquires subject brightness.

14. The image capturing method according to claim 11, further comprising:
    in the case of pickup in the second plane pickup mode, switching whether or not to set the diaphragm device to the open state based on the subject distance acquired using the subject distance acquisition unit by using the subject distance acquisition unit that acquires a subject distance.

15. The image capturing method according to claim 14, further comprising:
    in the case of pickup in the second plane pickup mode and when the subject distance is greater than a threshold, setting the diaphragm device to the open state.

16. The image capturing method according to claim 11, further comprising:
    in the case of pickup in the second plane pickup mode, switching whether or not to set the diaphragm device to the open state based on the focal distance acquired using focal distance acquisition unit by using the focal distance acquisition unit that acquires a focal distance of the optical pickup system.

17. The image capturing method according to claim 16, further comprising:
    in the case of pickup in the second plane pickup mode and when the focal distance is equal to or less than the threshold, setting the diaphragm device to the open state.

18. The image capturing method according to claim 14, further comprising:
    in the case of pickup in the second plane pickup mode and when the diaphragm device is set to the open state, switching whether or not to set the neutral density filter to an insertion state based on the subject brightness.

* * * * *